(12) United States Patent
Kojima et al.

(10) Patent No.: US 7,246,602 B2
(45) Date of Patent: Jul. 24, 2007

(54) FUEL SUPPLYING APPARATUS AND FUEL INJECTING APPARATUS OF INTERNAL COMBUSTION ENGINE

(75) Inventors: Susumu Kojima, Susono (JP); Motoki Ohtani, Toyota (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 211 days.

(21) Appl. No.: 10/940,647

(22) Filed: Sep. 15, 2004

(65) Prior Publication Data
US 2005/0072405 A1    Apr. 7, 2005

(30) Foreign Application Priority Data
Oct. 2, 2003    (JP)    ............... 2003-343900

(51) Int. Cl.
F02M 69/46    (2006.01)
F02M 59/46    (2006.01)

(52) U.S. Cl. ...................... 123/467; 123/456
(58) Field of Classification Search ............... 123/446, 123/447, 495, 497, 456, 468, 469, 467
See application file for complete search history.

(56) References Cited

U.S. PATENT DOCUMENTS

| | | | | |
|---|---|---|---|---|
| 4,064,855 A | * | 12/1977 | Johnson ...................... | 123/467 |
| 4,372,272 A | * | 2/1983 | Walter et al. ............... | 123/467 |
| 4,414,940 A | | 11/1983 | Loyd | |
| 4,608,957 A | * | 9/1986 | Kemmner ................... | 123/467 |
| 4,715,339 A | * | 12/1987 | Sagawa et al. .............. | 123/357 |
| 4,805,580 A | * | 2/1989 | Buisson et al. ............. | 123/506 |
| 5,509,391 A | * | 4/1996 | DeGroot ...................... | 123/467 |
| 5,727,525 A | * | 3/1998 | Tsuzuki ...................... | 123/447 |
| 5,752,486 A | * | 5/1998 | Nakashima et al. ........ | 123/467 |
| 6,276,334 B1 | | 8/2001 | Flynn et al. | |
| 6,405,709 B1 | * | 6/2002 | Carroll et al. .............. | 123/456 |
| 6,457,453 B1 | | 10/2002 | Tanabe et al. | |
| 6,598,590 B1 | * | 7/2003 | Mahr .......................... | 123/447 |
| 6,973,921 B2 | * | 12/2005 | Shafer et al. ............... | 123/495 |
| 2002/0139111 A1 | | 10/2002 | Ueda et al. | |
| 2003/0041838 A1 | | 3/2003 | Tsuchiya | |
| 2006/0000452 A1 | * | 1/2006 | Tokuda et al. .............. | 123/456 |

(Continued)

FOREIGN PATENT DOCUMENTS

EP    1 087 130 A2    3/2001

(Continued)

Primary Examiner—Thomas Moulis
(74) Attorney, Agent, or Firm—Oliff & Berridge PLC

(57) ABSTRACT

A fuel supplying apparatus of an internal combustion engine includes a first fuel supply system, a second fuel supply system, and a pulsation propagation suppressing unit. The first fuel supply system pressurizes a fuel by a low-pressure pump, and supplies the fuel pressurized by the low-pressure pump to a first fuel injection mechanism. The second fuel supply system is branched from the first fuel supply system, further pressurizes the fuel, pressurized by the low-pressure pump, by a high-pressure pump that is driven according to an operating state of the internal combustion engine, and supplies the fuel pressurized by the high-pressure pump to a second fuel injection mechanism. The pulsation propagation suppressing unit is provided in at least one of the first fuel supply system and the second fuel supply system, and suppresses propagation of a pulsation generated in the high-pressure pump to the first fuel injection mechanism.

7 Claims, 21 Drawing Sheets

U.S. PATENT DOCUMENTS

2006/0102149 A1 * 5/2006 Furusawa et al. ............ 123/446

FOREIGN PATENT DOCUMENTS

| JP | A 7-103048 | 4/1995 |
| JP | A 07-103050 | 4/1995 |
| JP | A 08-505680 | 6/1996 |
| JP | A-9-158814 | 6/1997 |
| JP | A-10-073062 | 3/1998 |
| JP | A 10-238437 | 9/1998 |
| JP | A 2000-8917 | 1/2000 |
| JP | A 2000-008997 | 1/2000 |
| WO | WO 03/008796 | 1/2003 |

* cited by examiner

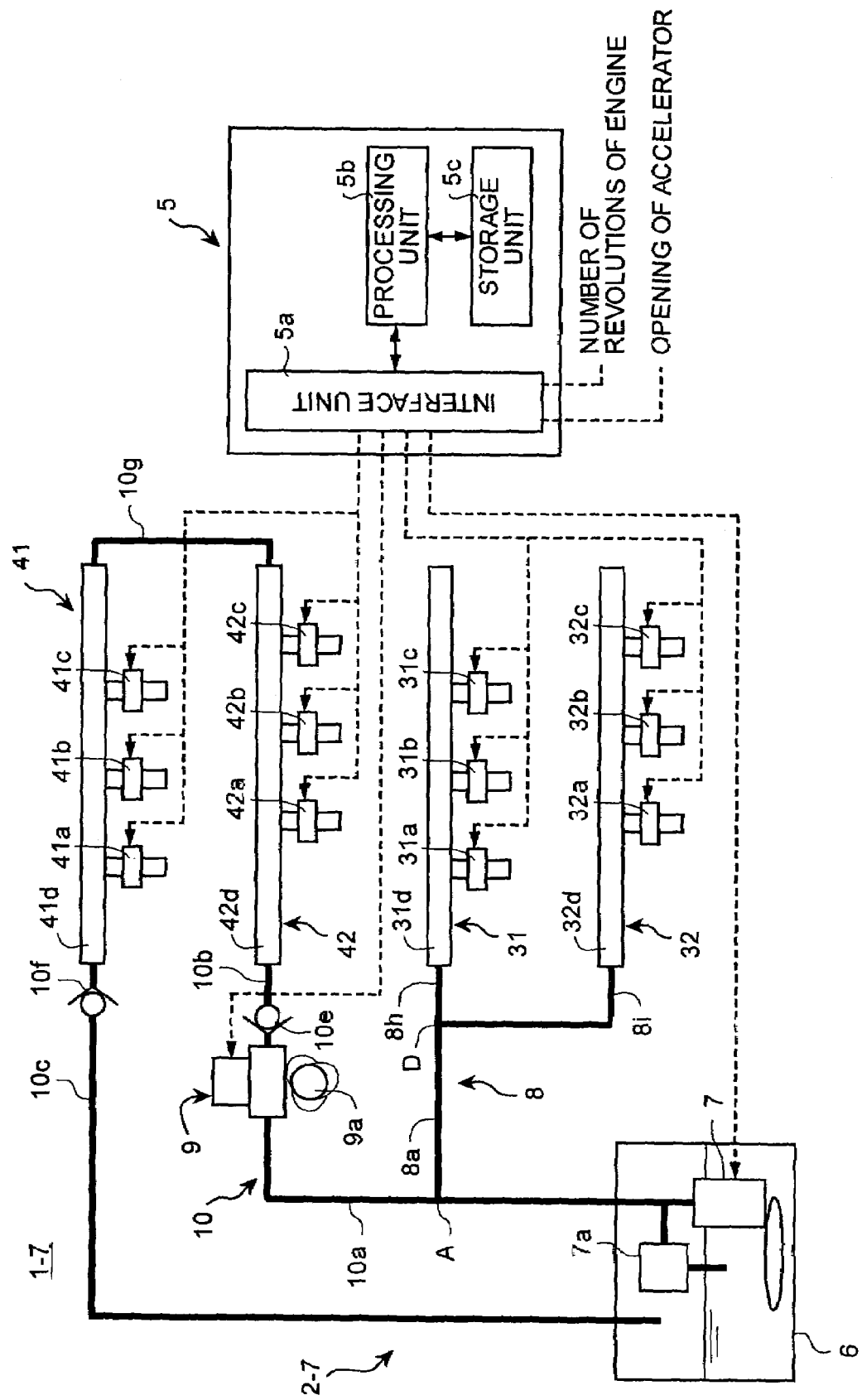

FUEL SUPPLYING APPARATUS AND FUEL INJECTING APPARATUS OF INTERNAL COMBUSTION ENGINE

BACKGROUND OF THE INVENTION

1) Field of the Invention

The present invention relates to a fuel supplying apparatus and a fuel injecting apparatus of an internal combustion engine.

2) Description of the Related Art

As methods for supplying a fuel to an internal combustion engine such as a gasoline engine or a diesel engine mounted in a vehicle such as a passenger vehicle or a truck, there are known an inter-cylinder injection method for directly injecting a fuel into cylinders of an internal combustion engine, an inter-intake path injection method for injecting a fuel into an intake path through which an air is supplied to the cylinder of the internal combustion engine, and an inter-cylinder/inter-intake path injection method that is a combination of the two methods, i.e., method for switching over between inter-cylinder injection and inter-intake path injection according to an operating state of the internal combustion engine.

As an internal combustion engine fuel injecting system that performs the inter-cylinder/inter-intake path injection according to the operating state of the internal combustion engine, there is known a system disclosed in, for example, Japanese Patent Application Laid-open Publication No. H7-103048. This internal combustion engine fuel injecting apparatus includes a fuel supplying system, a first fuel injection mechanism including an inter-intake path injector (an injection valve for injecting a fuel into an intake path of internal combustion engine) for the inter-intake path injection, and a second fuel injection mechanism including an inter-cylinder injector (a fuel injection valve for injecting a fuel into cylinders) for the inter-cylinder injection. The fuel supplying apparatus includes a first fuel supply system that pressurizes the fuel in a fuel tank by a low-pressure pump and that supplies the pressurized fuel to the first fuel injection mechanism, and a second fuel supply system that further pressurize the fuel pressurized by the low-pressure pump using the high-pressure pump and that supplies the pressurized fuel to the second fuel injection mechanism. The internal combustion engine fuel injecting apparatus controls injection of the first fuel injection mechanism and that of the second fuel injection mechanism according to a map that is generated based on a fuel supply amount (fuel injection amount), an accelerator opening (accelerator pedal depression amount), and the like. Specifically, ranges on the map is divided into three ranges, namely, an injection range for fuel injection only by the first fuel injection mechanism, an injection range for fuel injection by both the first and the second fuel injection mechanisms, and an injection range for fuel injection only by the second fuel injection mechanism. Based on the map, a control unit controls injection of the first fuel injection mechanism and/or the second fuel injection mechanism according to the operating state of the internal combustion engine.

Meanwhile, a conventional internal combustion engine fuel injecting apparatus includes a high-pressure pump for supplying the high-pressure fuel to the second fuel injection mechanism. This high-pressure pump is constituted so that a cam is driven by rotation of a crankshaft of the internal combustion engine to reciprocate a plunger of the high-pressure pump, and to thereby further pressurize the fuel pressurized by the low-pressure pump. This high-pressure pump continues to be driven by the rotation of the crankshaft of the internal combustion engine even when the control unit controls the inter-cylinder injectors not to inject a fuel, that is, the second fuel injection mechanism is not actuated. Therefore, pulsation occurs when the high-pressure pump absorbs the fuel from the second fuel supply system or returns an excessive fuel to a fuel tank and the like. This pulsation fluctuates a pressure of the fuel in paths of the second fuel supply system and the first fuel supply system, i.e., fluctuates a fuel pressure. This pulsation fluctuates of the fuel pressure is propagated to the first fuel injection mechanism. The control unit controls an injection timing and an injection amount of the fuel injected from the first fuel injection mechanism into an intake path of the internal combustion engine according to the operating state of the internal combustion engine. However, the propagation of the pulsation to the first fuel injection mechanism may possibly make it difficult or impossible to inject the fuel of an injection supply amount determined based on the operating state of the internal combustion engine, from the first fuel injection mechanism. In other words, the fuel in a fuel supply amount by which the fuel is to be supplied to the internal combustion engine may not properly be supplied from the fuel injecting apparatus.

SUMMARY OF THE INVENTION

It is an object of the present invention to solve at least the problems in the conventional technology.

A fuel supplying apparatus of an internal combustion engine according to one aspect of the present invention includes a first fuel supply system that pressurizes a fuel by a low-pressure pump, and that supplies the fuel pressurized by the low-pressure pump to a first fuel injection mechanism; a second fuel supply system that is branched from the first fuel supply system, that further pressurizes the fuel, pressurized by the low-pressure pump, by a high-pressure pump that is driven according to an operating state of the internal combustion engine, and that supplies the fuel pressurized by the high-pressure pump to a second fuel injection mechanism; and a pulsation propagation suppressing unit that is provided in at least one of the first fuel supply system and the second fuel supply system, and that suppresses propagation of a pulsation generated in the high-pressure pump to the first fuel injection mechanism.

A fuel supplying apparatus according to another aspect of the present invention includes a first fuel supply system that pressurizes a fuel by a low-pressure pump, and that supplies the fuel pressurized by the low-pressure pump to a first fuel injection mechanism; and a second fuel supply system that is branched from the first fuel supply system, that further pressurizes the fuel, pressurized by the low-pressure pump, by a high-pressure pump that is driven according to an operating state of the internal combustion engine, and that supplies the fuel pressurized by the high-pressure pump to a second fuel injection mechanism, wherein a path length from the high-pressure pump to the first fuel injection mechanism is a length such that the number of revolutions of the internal combustion engine, at which a pulsation propagated from the high-pressure pump to the first fuel injection mechanism is increased, is out of a common range of the number of revolutions of the internal combustion engine.

A fuel supplying apparatus according to still another aspect of the present invention includes a first fuel supply system that pressurizes a fuel by a low-pressure pump, and that supplies the fuel pressurized by the low-pressure pump to a first fuel injection mechanism; a second fuel supply system that is branched from the first fuel supply system, that further pressurizes the fuel, pressurized by the low-pressure pump, by a high-pressure pump that is driven according to an operating state of the internal combustion engine, and that supplies the fuel pressurized by the high-pressure pump to a second fuel injection mechanism; and a pulsation generating number-of-revolutions change unit that changes the number of revolutions of the internal engine at which a pulsation propagated from the high-pressure pump to the first fuel injection mechanism is increased.

A fuel supplying apparatus according to still another aspect of the present invention includes a first fuel supply system that pressurizes a fuel by a low-pressure pump, and that supplies the fuel pressurized by the low-pressure pump to a first fuel injection mechanism; and a second fuel supply system that is branched from the first fuel supply system, that further pressurizes the fuel, pressurized by the low-pressure pump, by a high-pressure pump that is driven according to an operating state of the internal combustion engine, and that supplies the fuel further pressurized by the high-pressure pump to a second fuel injection mechanism, wherein the first fuel injection mechanism is provided for each of cylinder groups of the internal combustion engine, and the first fuel supply system inverts a phase of a pulsation propagated from the high-pressure pump to the first fuel injection mechanism of the one of the cylinder groups, from a phase of the pulsation propagated from the high-pressure pump to the first fuel injection mechanism of the other cylinder group.

A fuel injecting apparatus according to still another aspect of the present invention includes a fuel supplying apparatus including a first fuel supply system that pressurizes a fuel by a low-pressure pump and that supplies the fuel pressurized by the low-pressure pump to a first fuel injection mechanism, and a second fuel supply system that is branched from the first fuel supply system, that further pressurizes the fuel, pressurized by the low-pressure pump, by a high-pressure pump that is driven according to an operating state of the internal combustion engine, and that supplies the fuel pressurized by the high-pressure pump to a second fuel injection mechanism; a first fuel injection mechanism that injects the fuel pressurized by the low-pressure pump; a second fuel injection mechanism that injects the fuel pressurized by the high-pressure pump; and a control unit that controls injection of the first fuel injection mechanism and injection of the second fuel injection mechanism according to the operating state of the internal combustion engine, wherein the first fuel injection mechanism is provided for each of cylinder groups of the internal combustion engine, the first fuel supply system inverts a phase of a pulsation propagated from the high-pressure pump to the first fuel injection mechanism of the one of the cylinder groups, from a phase of the pulsation propagated from the high-pressure pump to the first fuel injection mechanism of the other cylinder group, and the control unit controls the injection of the fuel from the first fuel injection mechanism based on a predetermined phase of the pulsation propagated from the high-pressure pump to the first fuel injection mechanism.

A fuel injecting apparatus according to still another aspect of the present invention includes a low-pressure pump that pressurizes a fuel; a first fuel injection mechanism that injects the fuel pressurized by the low-pressure pump; a first fuel supply system that supplies the fuel from the low-pressure pump to the first fuel injection mechanism; a high-pressure pump that further pressurizes the fuel pressurized by the low-pressure pump; a second fuel injection mechanism that injects the fuel pressurized by the high-pressure pump; a second fuel supply system that is branched from the first fuel supply system, and that supplies the fuel to the second fuel injection mechanism; and a control unit that controls injection of the first fuel injection mechanism and injection of the second fuel injection mechanism according to an operating state of the internal combustion engine, wherein when the control unit determines that an injection range of the fuel is an injection range only by the first fuel injection mechanism based on the operating state of the internal combustion engine, and determines that a pulsation propagated from the high-pressure pump to the first fuel injection mechanism is large, the control unit exercises a control so as to inject the fuel at least from the second fuel injection mechanism. The control so as to inject the fuel at least from the second fuel injection mechanism involves not only injecting the fuel from the first fuel injection mechanism and the second fuel injection mechanism but also stopping the injection of the fuel from the first fuel injection mechanism and injecting the fuel only from the second fuel injection mechanism.

A fuel injecting apparatus according to still another aspect of the present invention includes a low-pressure pump that pressurizes a fuel; a first fuel injection mechanism that injects the fuel pressurized by the low-pressure pump; a first fuel supply system that supplies the fuel from the low-pressure pump to the first fuel injection mechanism; a high-pressure pump that further pressurizes the fuel pressurized by the low-pressure pump; a second fuel injection mechanism that injects the fuel pressurized by the high-pressure pump; a second fuel supply system that is branched from the first fuel supply system, and that supplies the fuel to the second fuel injection mechanism; and a control unit that controls injection of the first fuel injection mechanism and injection of the second fuel injection mechanism according to an operating state of the internal combustion engine, wherein when the control unit determines that an injection range of the fuel is an injection range both by the first fuel injection mechanism and the second fuel injection mechanism based on the operating state of the internal combustion engine, and determines that a pulsation propagated from the high-pressure pump to the first fuel injection mechanism is large, the control unit exercises a control so as to increase the fuel injected from the second fuel injection mechanism. The control so as to increase the fuel injected from the second fuel injection mechanism involves not only increasing an injection amount of the fuel injected from the second fuel injection mechanism but also stopping the injection of the fuel from the first fuel injection mechanism and injecting the fuel only from the second fuel injection mechanism.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 18 is a configuration diagram of a fuel injecting apparatus including a fuel supplying apparatus according to a seventh embodiment;

DETAILED DESCRIPTION

Exemplary embodiments of the present invention will be explained in detail with reference to the accompanying drawings. Note that the present invention is not limited by the embodiments. Furthermore, components in the embodiments below may include ones essentially identical or easily occur to those skilled in the art. A fuel supplying apparatus or a fuel injecting apparatus including the fuel supplying apparatus to be explained hereinafter is an apparatus that supplies a fuel to an engine that is an internal combustion engine such as a gasoline engine or a diesel engine mounted in a vehicle such as a passenger vehicle or a truck. In the following embodiments, the fuel injecting apparatus including the fuel supplying apparatus is exemplary mounted in an inline four-cylinder engine having inline four cylinders or mounted in a V6 engine having six-cylinders in a V configuration wherein three cylinders of the six cylinders composes one cylinder group. However, the present invention is not limited to the embodiments. The present invention is also applicable to an inline six-cylinder engine, a V8 engine having eight cylinders in a V configuration wherein four cylinders of the eight cylinders composes one cylinder group, or the like.

Figure 1:
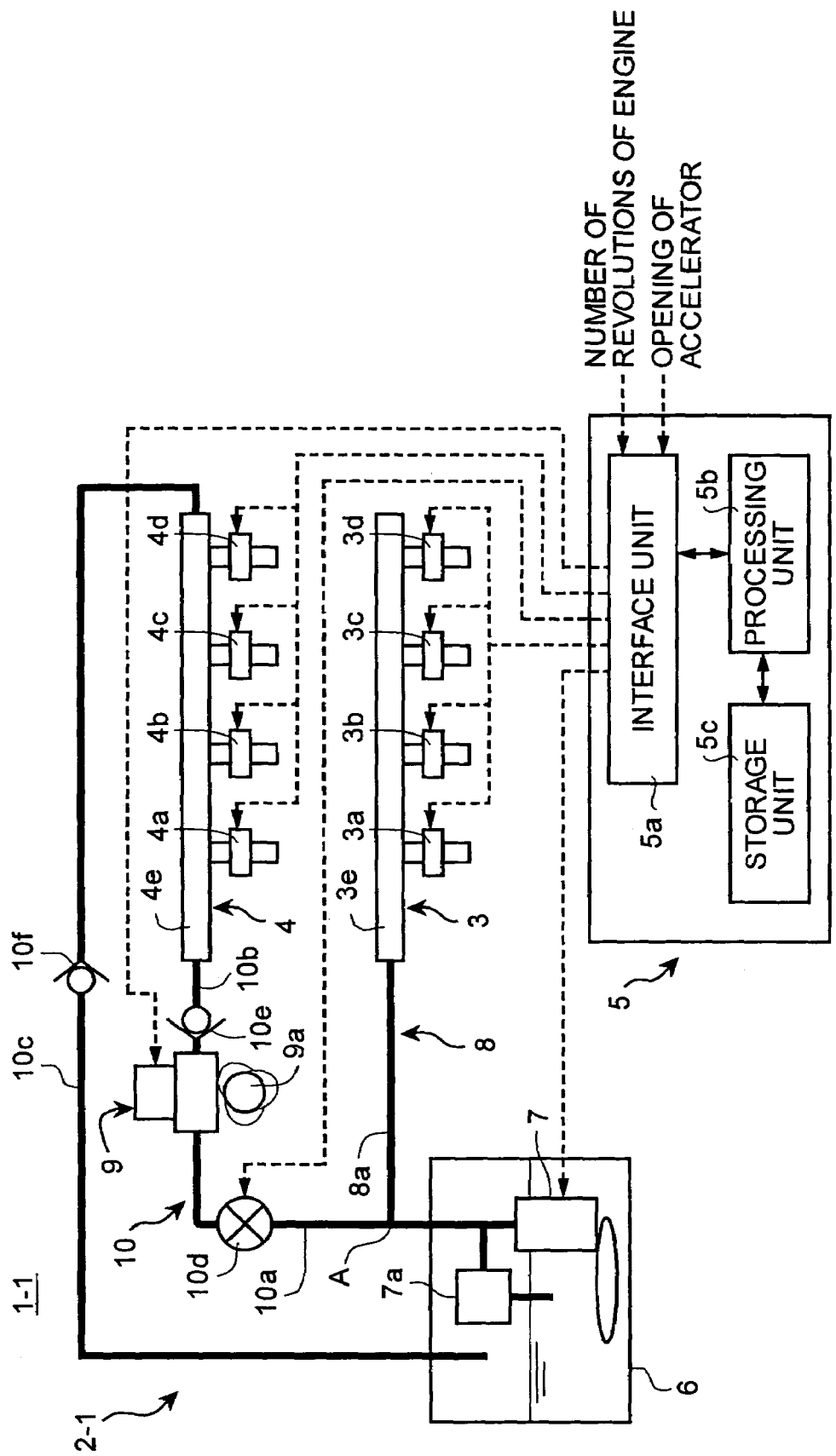
FIG. 1 is a configuration diagram of a fuel injecting apparatus including a fuel supplying apparatus according to a first embodiment of the present invention.
Figure 2:
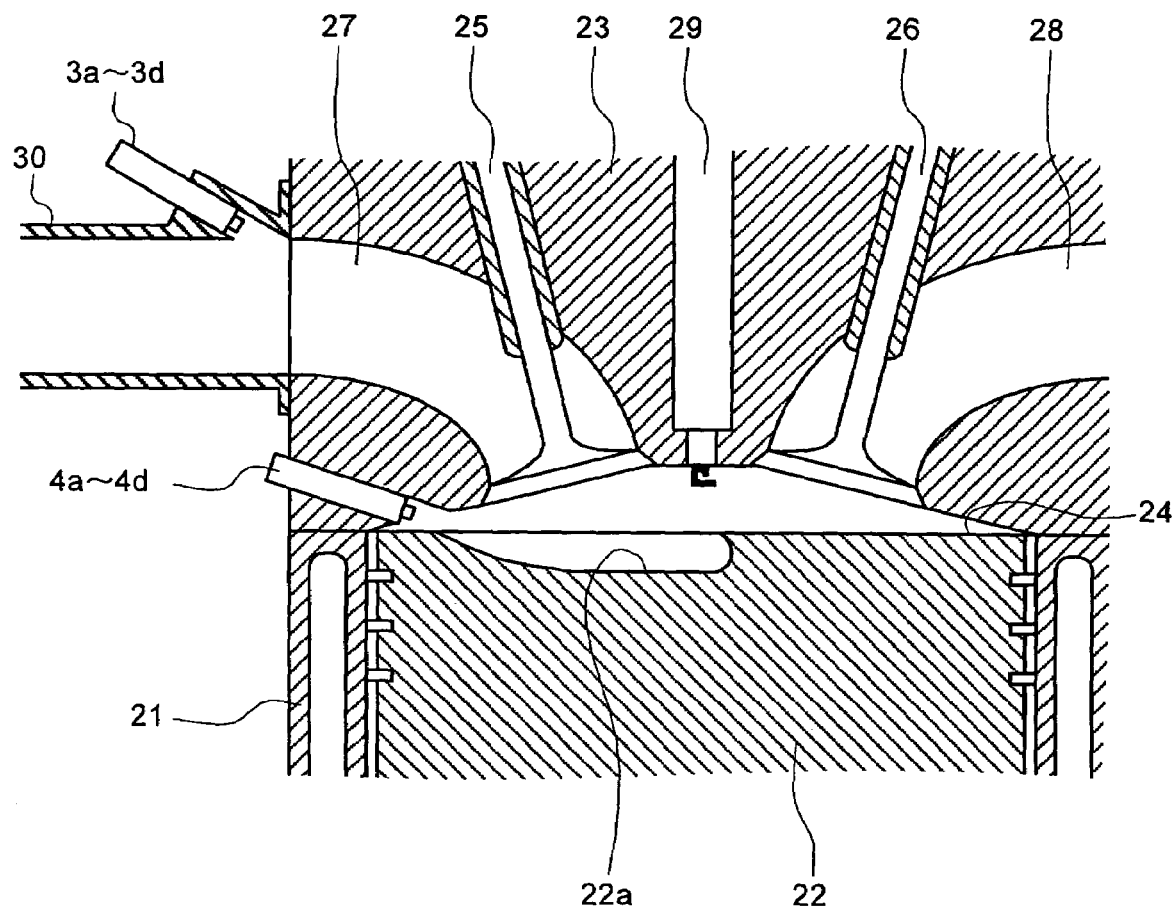
FIG. 2 is a cross sectional view of a cylinder of an internal combustion engine that includes the fuel injecting apparatus according to the first embodiment.

FIG. 1 is a configuration diagram of a fuel injecting apparatus including a fuel supplying apparatus according to a first embodiment. FIG. 2 is a cross sectional view of a cylinder of an internal combustion engine that includes the fuel injecting apparatus according to the first embodiment. As shown in FIG. 1, the fuel injecting apparatus 1-1 according to the first embodiment includes a fuel supplying apparatus 2-1, an inter-intake path fuel injection mechanism 3 that serves as a first fuel injection mechanism, an inter-cylinder fuel injection mechanism 4 that serves as a second fuel injection mechanism, and an injection controller 5 that serves as a control unit.

The fuel supplying apparatus 2-1 includes a fuel tank 6 that stores a fuel, a feed pump 7, a first fuel supply system 8, a high-pressure pump 9, and a second fuel supply system 10. The feed pump 7 is an electric low-pressure pump that pressurizes the fuel in the fuel tank 6 to a predetermined pressure (low pressure), and that supplies the pressurized fuel to the inter-intake path fuel injection mechanism 3. The first fuel supply system 8 is composed by a low-pressure path 8a for supplying the fuel pressurized at least by the feed pump 7 to the inter-intake path fuel injection mechanism 3. The high-pressure pump 9 is constituted as follows. A cam 9a coupled to a crankshaft of an engine (not shown in figures) is rotated, whereby a plunger (not shown in figures) in the high-pressure pump 9 reciprocates. The reciprocation of the plunger causes the fuel pressurized by the feed pump 7 in the low-pressure path 8a, that is, in the first fuel supply system 8, to be further pressurized to a predetermined pressure (high pressure), so as to supply the pressurized fuel to the inter-cylinder fuel injection mechanism 4. Namely, the high-pressure pump 9 is driven according to the operating state of the internal combustion engine. The high-pressure pump 9 includes a metering valve (not shown in figures) a valve opening of which is controlled by the injection controller 5 to be explained later. The second fuel supply system 10 includes a branch path 10a for supplying the fuel pressurized in the feed pump 7 at least from a branch part A of a low-pressure path 8a of the first fuel supply system 8 to the high-pressure pump 9, a high-pressure path 10b for supplying the fuel further pressurized by the high-pressure pump 9 to the inter-cylinder fuel injection mechanism 4, and a release path 10c for returning an excessive fuel among the fuel supplied to the inter-cylinder fuel supply mechanism 4 to the fuel tank 6.

At the branch path 10a of the second fuel supply system 10, i.e., an upstream side of the high-pressure pump 9 of the second fuel supply system 10, a shutoff valve 10d that is a pulsation propagation suppressing unit and that is controlled to be opened and closed by the injection controller to be explained later is provided. Reference numeral 7a denotes a regulator that returns a part of the fuel discharged from the feed pump 7 to the fuel tank 6 when the pressure of the fuel in the low-pressure path 8a that constitutes the first fuel supply system 8 is higher than the predetermined pressure, and that thereby keeps the pressure of the fuel in the low-pressure path 8a, that is, the pressure of the fuel supplied to the inter-intake path fuel injection mechanism 3 and the high-pressure pump 9 constant. Reference numeral 10e denotes a check valve that keeps the pressure of the fuel supplied into the inter-cylinder fuel injection mechanism 4 constant. Reference numeral 10f denotes a relief valve that returns a part of the fuel in the inter-cylinder fuel injection mechanism 4 to the fuel tank 6 when the pressure of the fuel supplied into the inter-cylinder fuel injection mechanism 4 is higher than the predetermined pressure and that keeps the pressure of the fuel in the inter-cylinder fuel injection mechanism 4 constant.

As shown in FIG. 2, the inter-intake path fuel injection mechanism 3 and the inter-cylinder fuel injection mechanism 4 include inter-intake path injectors 3a to 3d and inter-cylinder injectors 4a to 4d, respectively, to correspond to cylinders 20a to 20d of an inline four-cylinder engine. These inter-intake path injectors 3a to 3d and inter-cylinder injectors 4a to 4d are solenoid valves, and an injection amount of each injector is controlled by the injection controller 5, to be explained later, based on an injection timing and a current-carrying time for the injector. As shown in FIG. 1, the inter-intake path fuel injection mechanism 3 includes a fuel distribution pipe 3e that distributes the fuel supplied from the low-pressure path 8a of the first fuel supply system 8 to the respective inter-intake path injectors 3a to 3d. The inter-cylinder fuel injection mechanism 4 includes a fuel distribution pipe 4e that distributes the fuel supplied from the high-pressure path 10b of the second fuel supply system 10 to the respective inter-cylinder injectors 4a to 4d. The inter-intake path fuel injection mechanism 3 and the inter-cylinder fuel injection mechanism 4 include the inter-intake path injectors 3a to 3d and the inter-cylinder injectors 4a to 4d, respectively, to correspond to the cylinders 20a to 20d of the engine. Therefore, when the engine is, for example, a six-cylinder engine, the inter-intake path fuel injection mechanism 3 and the inter-cylinder fuel injection mechanism 4 include six inter-intake path injectors and six inter-cylinder injectors, respectively.

As shown in FIG. 2, each of the cylinders 20a to 20d of the engine includes a cylinder block 21, a piston 22, a cylinder head 23 fixed to the cylinder block 21, a fuel chamber 24 formed between the piston 22 and the cylinder head 23, an intake valve 25, an exhaust valve 26, an intake port 27, an exhaust port 28, and an ignition plug 29. The inter-intake path injectors 3a to 3d of the inter-intake path fuel injection mechanism 3 are provided to be able to inject a fuel into an intake path 30 communicating with the intake port 27. The inter-cylinder injectors 4a to 4d of the inter-cylinder fuel injection mechanism 4 are fixed to the cylinder head 23 and provided to be able to directly inject a fuel into the fuel chamber 24. Reference numeral 22a denotes a concave portion for introducing the fuel injected from the inter-cylinder injectors 4a to 4d to neighborhoods of the ignition plug 29. The inter-intake path injectors of the inter-intake path fuel injection mechanism 3 may inject the fuel into a surge tank (not shown in figures) provided upstream of the intake path 30 so as to supply the fuel to the engine.

In FIG. 1, the injection controller 5 receives input signals for the number of revolutions of the engine and the opening of the accelerator or the like from sensors attached to respective portions of the engine. The injection controller 5 outputs output signals for controlling injection timings and injection amounts of the inter-intake path injectors 3a to 3d of the inter-intake path fuel injection mechanism 3 and the inter-cylinder injectors 4a to 4d of the inter-cylinder injection mechanism 4, driving and stopping of the low-pressure pump 7, a valve opening of the metering valve of the high-pressure pump 9, the opening and closing of the shutoff valve 10d, and the like, based on the received input signals and various maps stored in a storage unit 5c. Specifically, the injection controller 5 includes an interface unit 5a for input and output of the input signals and the output signals, a processing unit 5b that calculates the injection timings, injection amounts, and the like of the inter-intake path injectors 3a to 3d of the inter-intake path fuel injection mechanism 3 and the inter-cylinder injectors 4a to 4d of the inter-cylinder fuel injection mechanism 4, and the storage unit 5c that stores the maps and the like. It is noted that this fuel injecting apparatus 5 may be realized by dedicated hardware. The processing unit 5b may be composed by a memory and a central processing unit (CPU) to realize a fuel injecting method, to be explained later, by loading a program based on the fuel injecting method, to be explained later, to the memory and executing the program. In addition, this fuel injecting apparatus 5 may be incorporated into an engine control unit (ECU) that controls the engine. Further, the storage unit 5c can be constituted by a nonvolatile memory such as a flash memory and the like, a volatile memory that can perform only reading such as a read only memory (ROM), a volatile memory that can perform reading and writing such as a random access memory (RAM), or a combination thereof.

Figure 3:
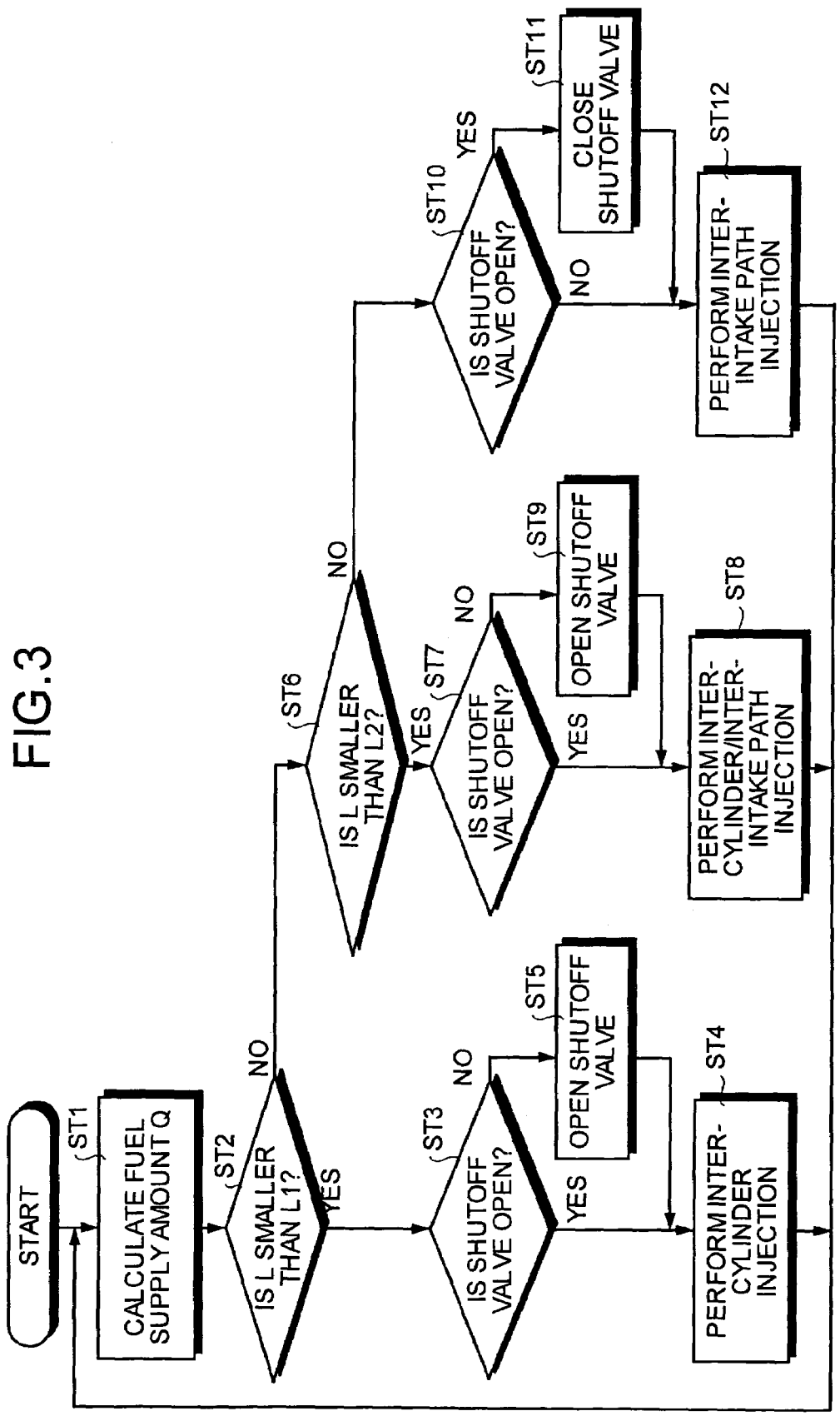
FIG. 3 is a flow chart of injection control of the fuel injecting apparatus according to the first embodiment.
Figure 4:
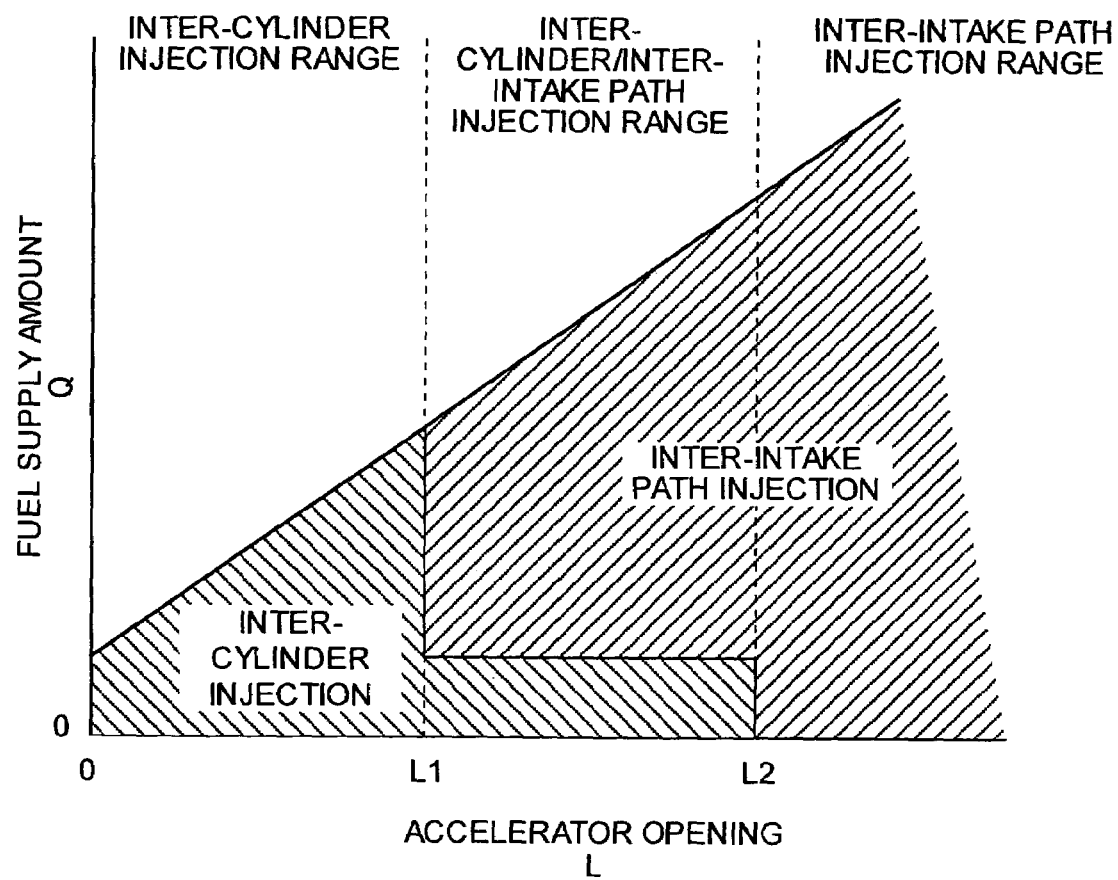
FIG. 4 is a map that represents a relationship between a fuel supply amount and an accelerator opening.

The fuel injecting method performed by the fuel injecting apparatus 1-1 will next be explained. FIG. 3 is a flow chart of injection control of the fuel injecting apparatus according to the first embodiment. FIG. 4 is a map that represents a relationship between a fuel supply amount and an accelerator opening. As shown in FIG. 3, the processing unit 5b of the fuel controller 5 calculates a fuel supply amount Q to be supplied to the engine (at a step ST1). The fuel supply amount Q is determined by the map that depicts the relationship between the number of revolutions of the engine and the accelerator opening (not shown in figures) stored in the storage unit 5c, and the input signals for the number of revolutions of the engine and accelerator opening input to the fuel controller 5 from the engine.

The processing unit 5b determines whether the accelerator opening L is smaller than a predetermined value L1 (at a step ST2). When the accelerator opening L is smaller than the predetermined value L1, the injection controller 5 that serves as the control unit determines that a fuel injection range is a fuel range of only the inter-cylinder fuel injection mechanism 4 that serves as the second fuel injection mechanism that is, an inter-cylinder injection range based on the operating state of the engine that serves as the internal combustion engine, as shown in FIG. 4. The processing unit 5b then determines whether the shutoff valve 10d is open (at a step ST3). When the processing unit 5b determines that the shutoff valve 10d is open, the processing unit 5b outputs the output signals for the injection timings and the injection amounts to the inter-cylinder injectors 4a to 4d of the inter-cylinder fuel injection mechanism 4 in order to supply the fuel that satisfies a fuel supply amount Q to the engine, and thereby the fuel injecting apparatus 1-1 performs inter-cylinder injection (at a step ST4).

Specifically, the inter-cylinder injectors 4a to 4d of the inter-cylinder fuel injection mechanism 4 inject the fuel into the fuel chamber 24 only once at a last period of a compression step for the cylinders 20a to 20d. The injected fuel is raised from below the ignition plug 29 toward the cylinder head 23 along a surface of the concave portion 22a of the piston 22 shown in FIG. 2, and mixed with the air that is introduced into the fuel chamber 24 in advance by opening the intake valve 25, thereby forming a mixture gas. This mixture gas is ignited by the ignition plug 29, thereby applying a rotation force to the crankshaft of the engine (not shown in figures). If determining that the shutoff valve 10*d* is closed at a step ST3, the processing unit 5*b* outputs an output signal for opening this shutoff valve 10*d* to the shutoff valve 10*d*, and thereby opening the shutoff valve 10*d* (at a step ST5).

When the accelerator opening L is equal to or larger than the predetermined value L1, the processing unit 5*b* determines whether the accelerator opening L is smaller than a predetermined value L2 (at a step ST6). When the accelerator opening L is smaller than the predetermined value L2, the injection controller 5 that serves as the control unit determines that the fuel injection range is a fuel range of the inter-cylinder fuel injection mechanism 4 that serves as the second fuel injection mechanism and the inter-intake path fuel injection mechanism 3 that serves as the first fuel injection mechanism, that is, an inter-cylinder and inter-intake path injection range, based on the operating state of the engine that serves as the internal combustion engine, as shown in FIG. 4. The processing unit 5*b* then determines whether the shutoff valve 10*d* is open (at a step ST7). If determining that the shutoff valve 10*d* is open, the processing unit 5*b* outputs the output signals for the injection timings and the injection amounts to the inter-intake path injectors 3*a* to 3*d* of the inter-intake path fuel injection mechanism 3 and the inter-cylinder injectors 4*a* to 4*d* of the inter-cylinder fuel injection mechanism 4 in order to supply the fuel that satisfies a fuel supply amount Q to the engine, and thereby the fuel injecting apparatus 1-1 performs inter-cylinder and inter-intake path injection (at a step ST8).

Specifically, as shown in FIG. 2, the inter-intake path injectors 3*a* to 3*d* of the inter-intake path fuel injection mechanism 3 inject the fuel into the intake path 30 only once at an initial period of the intake step for the cylinders 20*a* to 20*d*. The fuel thus injected is mixed with the air in the intake path 30 to form a mixture gas, and the mixture gas is introduced into the fuel chamber 24 via the intake port 27. The inter-cylinder injectors 4*a* to 4*d* of the inter-cylinder fuel injection mechanism 4 inject the fuel into the fuel chamber 24 only once at the last period of the compression step for the cylinder 20*a* to 20*d*. The injected fuel is raised from below the ignition plug 29 toward the cylinder had 23 along the surface of the concave portion 22*a* of the piston 22, and further mixed with that mixture gas introduced into the fuel chamber 24 in advance by opening the intake valve 25, thereby forming a mixture gas that is ignitable by the ignition plug 29. This mixture gas is ignited by the ignition plug 29, thereby applying a rotation force to the crankshaft of the engine (not shown in figures). If determining that the shutoff valve 10*d* is closed at the step S7, the processing unit 5*b* outputs the output signal for opening the shutoff valve 10*d* to the shutoff valve 10*d*, thereby opening the shutoff valve 10*d* (at a step ST9).

When determining that the acceleration opening L is equal to or larger than the predetermined value L2 at the step ST6, the injection controller 5 that serves as the control unit determines that the injection range is an injection range of only the inter-intake path fuel injection mechanism 3 that serves as the first fuel injection mechanism, that is, an inter-intake path injection range, based on the operating state of the engine that serves as the internal combustion engine. The processing unit 5*b* then determines whether the shutoff valve 10*d* is open (at a step ST10). If determining that the shutoff valve 10*d* is open, the processing unit 5*b* outputs the output signal for closing the shutoff valve 10*d* to the shutoff valve 10*d*, thereby closing the shutoff valve 10*d* (at a step ST11). When the shutoff valve 10*d* is closed, pulsation generated in the high-pressure pump 9 is not propagated to the low-pressure path 8*a* of the first fuel supply system 8. Namely, the propagation of the pulsation generated in the high-pressure pump 9 to the inter-intake path fuel injection mechanism 3 that serves as the first fuel injection mechanism is suppressed. When the processing unit 5*b* determines that the shutoff valve 10*d* is closed at the step ST11, then the processing unit 5*b* outputs the output signals for the injection timings and the injection amounts to the inter-intake path injectors 3*a* to 3*d* of the inter-intake path fuel injection mechanism 3 in order to supply the fuel that satisfies a fuel supply amount Q to the engine, and thereby the fuel injecting apparatus 1-1 performs inter-intake path injection (at a step ST12). At this time, the fuel injection amount of the respective inter-intake path injectors 3*a* to 3*d* does not differ from the fuel supply amount Q since the pulsation generated in the high-pressure pump 9 is not propagated to the inter-intake path fuel injection mechanism 3.

Specifically, as shown in FIG. 2, the inter-intake path injectors 3*a* to 3*d* of the inter-intake path fuel injection mechanism 3 inject the fuel into the intake path 30 only once at the initial period of the intake step for the cylinders 20*a* to 20*d*. The injected fuel is mixed with the air in the intake path 30 into a mixture gas, and the mixture gas is introduced into the fuel chamber 24 through the intake port 27. This mixture gas is ignited by the ignition plug 29, thereby applying a rotation force to the crankshaft of the engine (not shown in figures). Thus, by suppressing the propagation of the pulsation generated in the high-pressure pump 9 to the inter-intake path fuel injection mechanism 3, the influence of the pulsation generated in the high-pressure pump 9 on the fuel supply amount by which the fuel is supplied into the engine, particularly, the fuel injection amount by which the fuel is injected from the inter-intake path injectors 3*a* to 3*d* of the inter-intake path fuel injection mechanism 3 that serves as that first fuel injection mechanism can be lessened.

Alternatively, instead of the shutoff valve 10*d*, the metering valve (not shown in figures) provided in the high-pressure pump 9 shown in FIG. 1 may be utilized to operate similarly to the shutoff valve 10*d*. Namely, by closing the metering valve of the high-pressure pump 9 when the injection controller 5 determines that the injection range is the inter-intake path injection range, the propagation of the pulsation generated in the high-pressure pump 9 to the inter-intake path fuel injection mechanism 3 that serve as the first fuel injection mechanism may be suppressed. In this case, the influence of the pulsation generated in the high-pressure pump 9 on the fuel supply amount by which the fuel is supplied to the engine can be lessened without increasing the number of components that constitute the fuel supplying apparatus 2-1 of the engine or that constitute the fuel injecting apparatus 1-1 that includes the fuel supplying apparatus 2-1.

Figure 5:
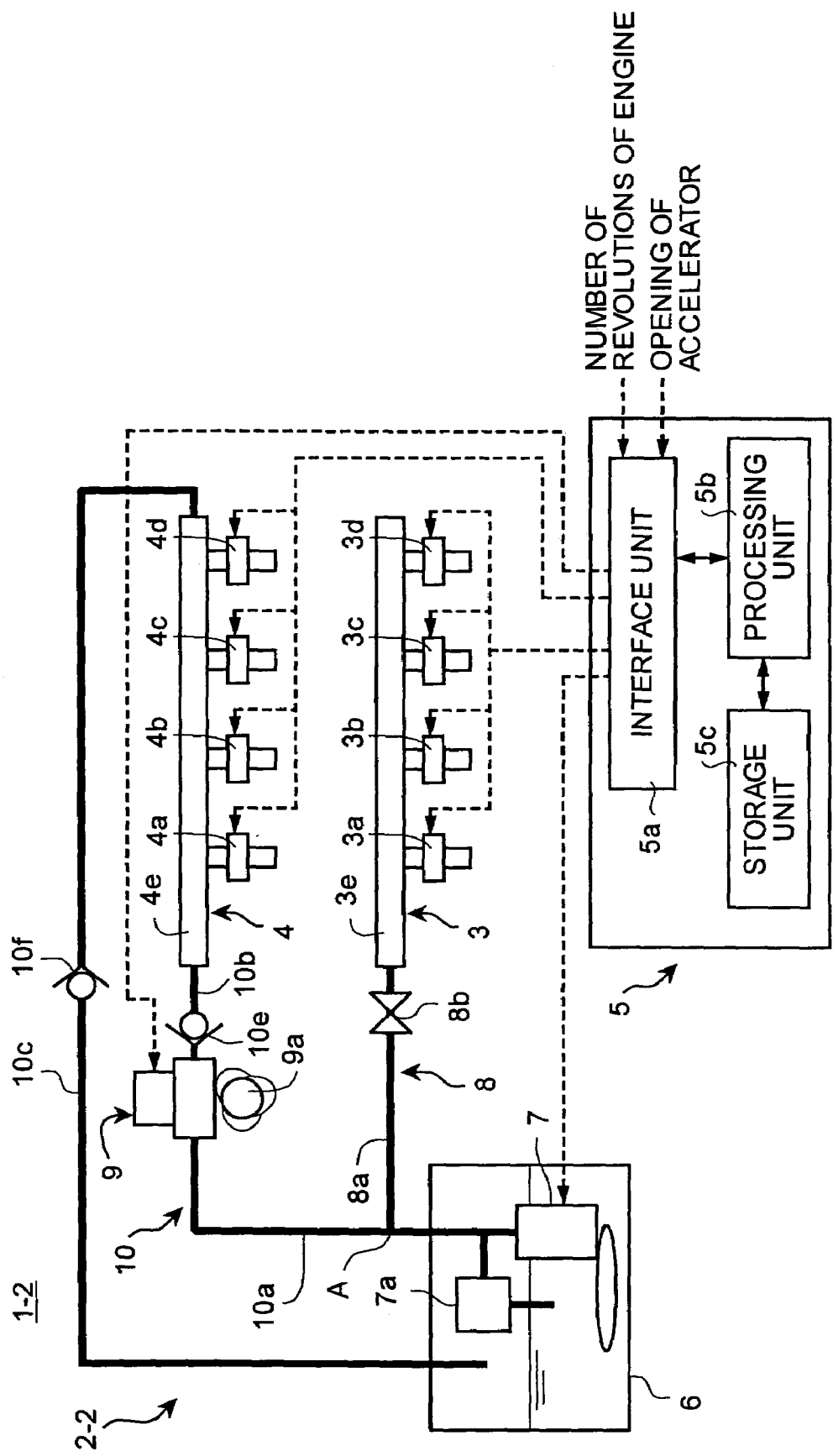
FIG. 5 is a configuration diagram of a fuel injecting apparatus including a fuel supplying apparatus according to a second embodiment.

FIG. 5 is a configuration diagram of a fuel injecting apparatus including a fuel supplying apparatus according to a second embodiment. A fuel injecting apparatus 1-2 shown in FIG. 5 differs from the fuel injecting apparatus 1-1 shown in FIG. 1 in that a fuel supplying apparatus 2-2 includes a fixed throttle 8*b* in stead of the shutoff valve 10*d*. Since the basic configuration of the fuel injecting apparatus 1-2 shown in FIG. 5 is the same as that of the fuel injecting apparatus 1-1 shown in FIG. 1, the explanation of the basic configuration of the fuel injecting apparatus 1-2 will be omitted.

In the low-pressure path 8*a* of the first fuel supply system 8, the fixed throttle 8*b* that serves as a pulsation propagation suppressing unit is provided between the branch part A at which the second fuel supply system 10 is branched and the inter-intake path fuel injection mechanism 3 that serves as the first fuel injection mechanism. A throttling amount of the fixed throttle 8b is set so as to reduce the propagated pulsation, that is, a width of a fluctuation in the pressure of the fuel supplied into the inter-intake path fuel injection mechanism 3 when the pulsation generated in the high-pressure pump 9 is propagated to the inter-intake path fuel injection mechanism 3. When the throttling amount of the fixed throttle 8b is set too large, the fuel passed through the fixed throttle 8b and supplied into the inter-intake path fuel injection mechanism 3 cannot be injected from the inter-intake path injectors 3a to 3d when a flow rate of the fuel supplied to the first fuel supply system 8 is low. It is, therefore, preferable to set the throttling amount so as to be able to at least inject the fuel from the inter-intake path injectors 3a to 3d.

Figure 6:
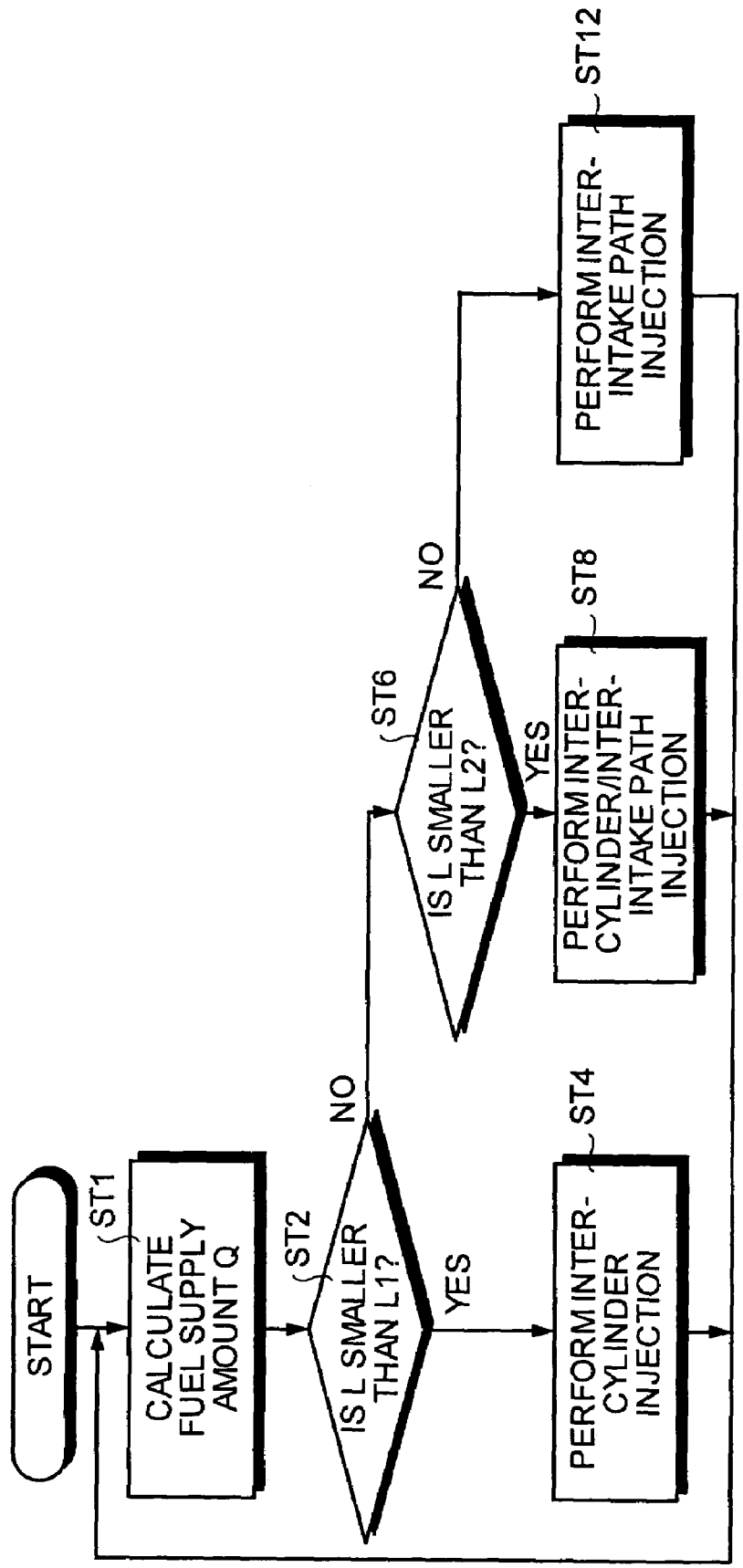
FIG. 6 is a flow chart of injection control of a fuel injecting apparatus according to the second embodiment.

A fuel injecting method performed by the fuel injecting apparatus 1-2 will next be explained. FIG. 6 is a flow chart of injection control of a fuel injecting apparatus according to the second embodiment. The flow of the fuel injecting method of the fuel injecting apparatus 1-2 shown in FIG. 6 is basically the same as that of the fuel injecting method of the fuel injecting apparatus 1-1 shown in FIG. 3. Therefore, the flow shown in FIG. 6 will be explained simply. As shown in FIG. 6, the processing unit 5b of the fuel controller 5 calculates the fuel supply amount Q supplied to the engine (at a step ST1).

The processing unit 5b determines whether the accelerator opening L is smaller than the predetermined value L1 (at a step ST2). When the accelerator opening L is smaller than the predetermined value L1, the injection controller 5 that serves as the control unit determines that a fuel injection range is an inter-cylinder injection range, based on the operating state of the engine that serves as the internal combustion engine, as shown in FIG. 4. The processing unit 5b outputs the output signals for the injection timings and the injection amounts to the inter-cylinder injectors 4a to 4d of the inter-cylinder fuel injection mechanism 4 in order to supply the fuel that satisfies the fuel supply amount Q to the engine, and thereby the fuel injecting apparatus 1-2 performs inter-cylinder injection (at a step ST4).

When the accelerator opening L is equal to or larger than the predetermined value L1, the processing unit 5b determines whether the accelerator opening L is smaller than the predetermined value L2 (at a step ST6). When the accelerator opening L is smaller than the predetermined value L2, the injection controller 5 that serves as the control unit determines that the injection range is the inter-cylinder and inter-intake path injection range, as shown in FIG. 4. The processing unit 5b outputs the output signals for the injection timings and the injection amounts to the inter-intake path injectors 3a to 3d of the inter-intake path fuel injection mechanism 3 and the inter-cylinder injectors 4a to 4d of the inter-cylinder fuel injection mechanism 4 in order to supply the fuel that satisfies the fuel supply amount Q to the engine, and the fuel injecting apparatus 1-2 performs inter-cylinder and inter-intake path injection (at a step ST8). The pulsation generated in the high-pressure pump 9 is propagated to the low-pressure path 8a of the first fuel supply system 8 through the branch path 10a of the second fuel supply system 10. A magnitude of the pulsation propagated to the low-pressure path 8a is reduced by the fixed throttle 8b of this low-pressure path 8a. Namely, the pulsation propagated to the low-pressure path 8a downstream of this fixed throttle 8b and to the inter-intake path fuel injection mechanism 3 that serves as the first fuel injection mechanism, that is, a width of a fluctuation in the pressure of the fuel is smaller than a width of a fluctuation in the pressure of the fuel upstream of the fixed throttle 8b. Accordingly, in the inter-cylinder and inter-intake path injection for supplying the fuel to the engine by both the first fuel injection mechanism and the second fuel injection mechanism, the propagation of the pulsation generated in the high-pressure pump 9 to the inter-intake path fuel injection mechanism 3 can be suppressed. The injection amount of the fuel injected from the inter-intake path injectors 3a to 3d can be, therefore, made substantially equal to the fuel supply amount Q.

When the acceleration opening L is equal to or larger than the predetermined value L2 at the step ST6, the injection controller 5 that serves as the control unit determines that the injection range is an inter-intake path injection range. The processing unit 5b outputs the output signals for the injection timings and the injection amounts to the inter-intake path injectors 3a to 3d of the inter-intake path fuel injection mechanism 3 in order to supply the fuel that satisfies the fuel supply amount Q to the engine, and the fuel injecting apparatus 1-2 performs inter-intake path injection (at a step ST12). At this time, similarly to the above, even if the pulsation generated in the high-pressure pump 9 is propagated to the low-pressure path 8a, the magnitude of the pulsation is reduced by the fixed throttle 8b of the low-pressure path 8a. Namely, the pulsation propagated to the low-pressure path 8a downstream of the fixed throttle 8b and the inter-intake path fuel injection mechanism 3 that serves as the first fuel injection mechanism, that is, the width of the fluctuation in the pressure of the fuel is smaller than the width of the fluctuation in the pressure of the fuel upstream of the fixed throttle 8b. Accordingly, in the inter-intake path injection for supplying the fuel to the engine only by the first fuel injection mechanism, the propagation of the pulsation generated in the high-pressure pump 9 to the inter-intake path fuel injection mechanism 3 can be suppressed. The injection amount of the fuel injected from the inter-intake path injectors 3a to 3d can be, therefore, made substantially equal to the fuel supply amount Q. Thus, by suppressing the propagation of the pulsation generated in the high-pressure pump 9 to the inter-intake path fuel injection mechanism 3, the influence of the pulsation generated in the high-pressure pump 9 on the fuel supply amount by which the fuel is supplied into the engine, particularly, the fuel injection amount by which the fuel is injected from the inter-intake path injectors 3a to 3d of the inter-intake path fuel injection mechanism 3 that serves as that first fuel injection mechanism can be lessened.

Figure 7:
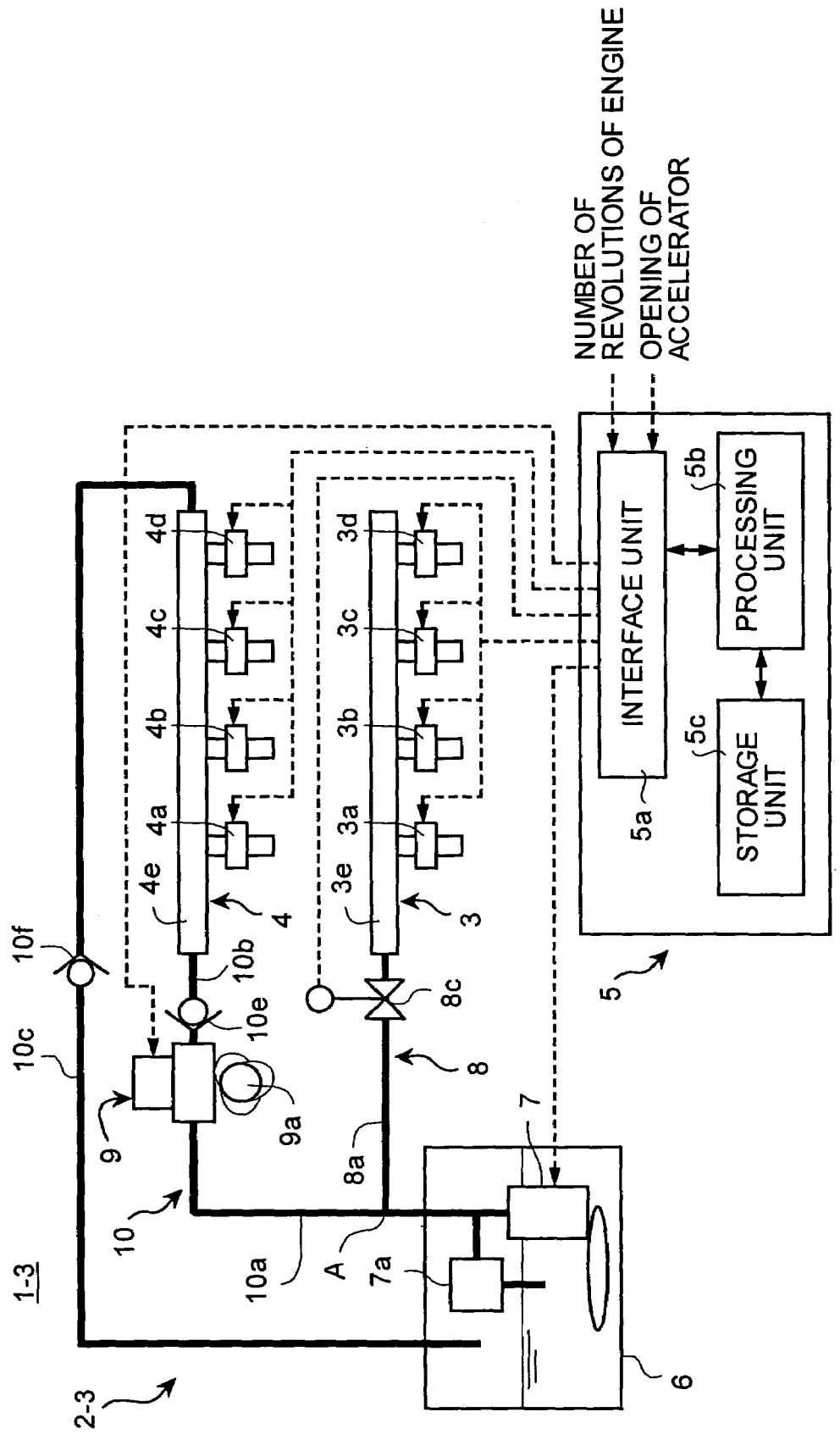
FIG. 7 is a configuration diagram of a fuel injecting apparatus including a fuel supplying apparatus according to a third embodiment.

FIG. 7 is a configuration diagram of a fuel injecting apparatus including a fuel supplying apparatus according to a third embodiment. A fuel injecting apparatus 1-3 shown in FIG. 7 differs from the fuel injecting apparatus 1-2 shown in FIG. 5 in that a fuel supplying apparatus 2-3 includes a variable throttle 8c a throttling amount of which is changed according to the operating state of the engine in stead of the fixed throttle 8b. Since the basic configuration of the fuel injecting apparatus 1-3 shown in FIG. 7 is the same as that of the fuel injecting apparatus 1-2 shown in FIG. 5, the explanation of the basic configuration of the fuel injecting apparatus 1-3 will be omitted.

The variable throttle 8c that serves as a pulsation propagation suppressing unit is provided between the branch part A at which the second fuel supply system 10 is branched and the inter-intake path fuel injection mechanism 3 that serves as the first fuel injection mechanism. A throttle amount of the variable throttle 8c is controlled by an output signal from the injection controller 5.

Figure 8:
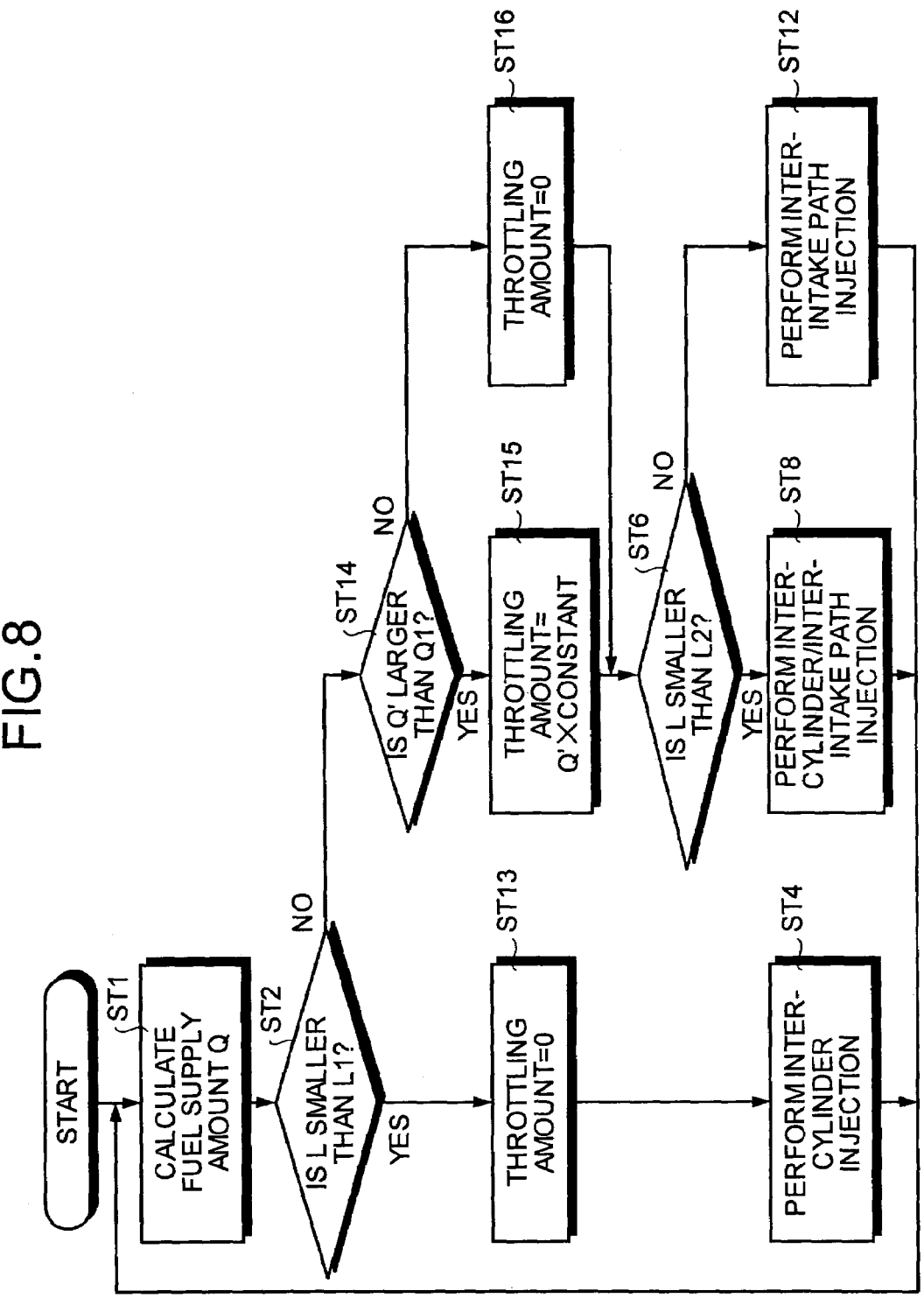
FIG. 8 is a flow chart of injection control of the fuel injecting apparatus according to the third embodiment.

A fuel injecting method performed by the fuel injecting apparatus 1-3 will next be explained. FIG. 8 is a flow chart of injection control of the fuel injecting apparatus according to the third embodiment. As the operating state of the engine, a fuel injecting method based on changes of a flow rate of the fuel supplied into the low-pressure path 8a that constitutes the first fuel supply system 8 will be explained herein. The flow of the fuel injecting method of the fuel injecting apparatus 1-3 shown in FIG. 8 is basically the same as that of the fuel injecting method of the fuel injecting apparatus 1-2 shown in FIG. 6. Therefore, the flow will be explained simply. As shown in FIG. 8, the processing unit 5b of the fuel controller 5 calculates the fuel supply amount Q to be supplied to the engine (at a step ST1).

The processing unit 5b determines whether the accelerator opening L is smaller than the predetermined value L1 (at a step ST2). When the accelerator opening L is smaller than the predetermined value L1, the injection controller 5 that serves as the control unit determines that a fuel injection range is an inter-cylinder injection range based on the operating state of the engine that serves as the internal combustion engine, as shown in FIG. 4. The processing unit 5b outputs the output signal for controlling the throttling amount of the variable throttle 8c at zero, that is, the output signal so as not to throttle the variable throttle 8c, to this variable throttle 8c (at a step ST13). When the fuel is supplied to the engine by the inter-cylinder injection, the throttling amount of the variable throttle 8c is set zero to prevent a fluctuation in the throttling amount. By doing so, the injection amount of the fuel injected from the inter-cylinder injectors 4a to 4d of the inter-cylinder fuel injection mechanism 4 is prevented from differing from the fuel supply amount Q of the fuel supplied to the engine. The processing unit 5b then outputs the output signals for the injection timings and the injection amounts to the inter-cylinder injectors 4a to 4d of the inter-cylinder fuel injection mechanism 4, and the fuel injecting apparatus 1-3 performs inter-cylinder injection (at a step ST4).

When the accelerator opening L is equal to or larger than the predetermined value L1 at the step ST2, the processing unit 5b determines whether a fuel flow rate Q' of the fuel supplied into the low-pressure path 8a that constitutes the first fuel supply system 8 is higher than a predetermined value Q1 (at a step ST14). The fuel flow rate Q' is calculated based on a driven state of the low-pressure pump 7. In addition, the predetermined value Q1 is a fuel flow rate within the low-pressure path 8a that constitutes the first fuel supply system 8 that flow rate is necessary so that the inter-intake path injectors 3a to 3d of the inter-intake path fuel injection mechanism 3 inject the fuel. When the fuel flow rate Q' is higher than the predetermined value Q1, the processing unit 5b outputs an output signal for setting the throttling amount of the variable throttle 8c at an amount obtained by multiplying the fuel flow rate Q' by a constant, to the variable throttle 8c (at a step ST15). That is, the injection controller 5 controls the throttling amount of the variable throttle 8c so that the throttling amount is larger proportionally to an increase in the fuel flow rate Q'. When the fuel flow rate Q' is equal to or lower than the predetermined value Q1 at the step ST14, the processing unit 5b outputs an output signal for setting the throttling amount of the variable throttle 8c at zero, that is, an output signal so as not to throttle the variable throttle 8c, to this variable throttle 8c (at a step ST16). The setting is made because, by throttling the variable throttle 8c when the fuel flow rate Q' is equal to or lower than the predetermined value Q1, the incapability of injecting the fuel from the inter-intake path injectors 3a to 3d of the inter-intake path fuel injection mechanism 3 is prevented.

After the throttling amount of the variable throttle 8c is controlled, the processing unit 5b determines whether the accelerator opening L is smaller than the predetermined value L2 (at a step ST6). When the accelerator opening L is smaller than the predetermined value L2, the injection controller 5 that serves as the control unit determines that the injection range is the injection range is an inter-cylinder and inter-intake path injection range, as shown in FIG. 4. The processing unit 5b outputs the output signals for the injection timings and the injection amounts to the inter-intake path injectors 3a to 3d of the inter-intake path fuel injection mechanism 3 and the inter-cylinder injectors 4a to 4d of the inter-cylinder fuel injection mechanism 4, and the fuel injecting apparatus 1-3 performs inter-cylinder and inter-intake path injection (at a step ST8). The pulsation generated in the high-pressure pump 9 is propagated to the low-pressure path 8a of the first fuel supply system 8 through the branch path 10a of the second fuel supply system 10. At this time, the throttling amount of the variable throttle 8c of the low-pressure path 8a is increased in proportion to the operating state of the engine, that is, in proportion to an increase in the fuel flow rate Q' of the fuel supplied to the low-pressure path 8a that constitutes the first fuel supply system 8. Therefore, the pulsation propagated to the low-pressure path 8a is reduced. Namely, the pulsation propagated to the low-pressure path 8a downstream of the variable throttle 8c and the inter-intake path fuel injection mechanism 3 that serves as the first fuel injection mechanism, that is, a width of a fluctuation in the pressure of the fuel is smaller than a width of a fluctuation in the pressure of the fuel upstream of the variable throttle 8c. Accordingly, in the inter-cylinder and inter-intake path injection for supplying the fuel to the engine by both the first fuel injection mechanism and the second fuel injection mechanism, the propagation of the pulsation generated in the high-pressure pump 9 to the inter-intake path fuel injection mechanism 3 can be suppressed. The injection amount of the fuel injected from the inter-intake path injectors 3a to 3d can be similarly, therefore, made substantially equal to the fuel supply amount Q.

When the acceleration opening L is equal to or larger than the predetermined value L2 at the step ST6, the injection controller 5 that serves as the control unit determines that the injection range is an inter-intake path injection range. The processing unit 5b outputs the output signals for the injection timings and the injection amounts to the inter-intake path injectors 3a to 3d of the inter-intake path fuel injection mechanism 3 in order to supply the fuel that satisfies the fuel supply amount Q to the engine, and the fuel injecting apparatus 1-3 performs inter-intake path injection (at a step ST12). At this time, the pulsation generated in the high-pressure pump 9 is propagated to the low-pressure path 8a of the first fuel supply system 8 through the branch path 10a of the second fuel supply system 10. If so, the throttling amount of the variable throttle 8c of the low-pressure path 8a is increased in proportion to the operating state of the engine, that is, an increase in the fuel flow rate Q' of the fuel supplied to the low-pressure path 8a that constitutes the first fuel supply system 8. Therefore, the pulsation propagated to the inter-intake path fuel injection mechanism 3 is reduced. Namely, the pulsation propagated to the low-pressure path 8a downstream of the variable throttle 8c and the inter-intake path fuel injection mechanism 3 that serves as the first fuel injection mechanism, that is, the width of the fluctuation in the pressure of the fuel is smaller than the width of the fluctuation in the pressure of the fuel upstream of the variable throttle 8c. Accordingly, in the inter-intake path injection for supplying the fuel to the engine only by the first fuel injection mechanism, the propagation of the pulsation generated in the high-pressure pump 9 to the inter-intake path fuel injection mechanism 3 can be suppressed. The injection amount of the fuel injected from the inter-intake path injectors 3a to 3d can be, therefore, made substantially equal to the fuel supply amount Q. Thus, by suppressing the propagation of the pulsation generated in the high-pressure pump 9 to the inter-intake path fuel injection mechanism 3, the influence of the pulsation generated in the high-pressure pump 9 on the fuel supply amount by which the fuel is supplied into the engine, particularly, the fuel injection amount by which the fuel is injected from the inter-intake path injectors 3a to 3d of the inter-intake path fuel injection mechanism 3 that serves as that first fuel injection mechanism can be lessened.

At the step ST16, when the processing unit 5b outputs the output signal for setting the throttling amount of the variable throttle 8c at zero to the variable throttle 8c, the processing unit 5b determines whether the accelerator opening L is smaller than the predetermined value L2 (at a step ST6). When the accelerator opening L is smaller than the predetermined value L2, the fuel injecting apparatus 1-3 performs inter-cylinder and inter-intake path injection (at a step ST8). When the accelerator opening L is equal to or larger than the predetermined value L2, the fuel injecting apparatus 1-3 performs inter-intake path injection (at a step ST12).

Figure 9:
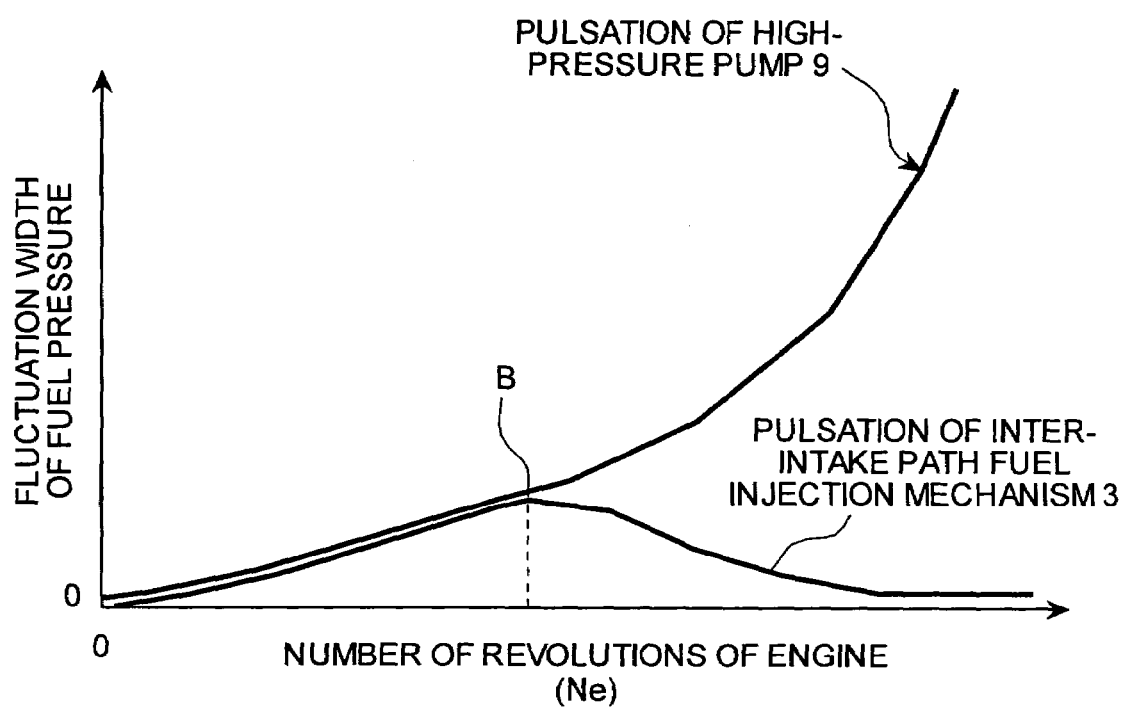
FIG. 9 is a diagram for explaining a relationship between a width of a fluctuation in the pressure of a fuel and the number of revolutions of the engine.
Figure 10:
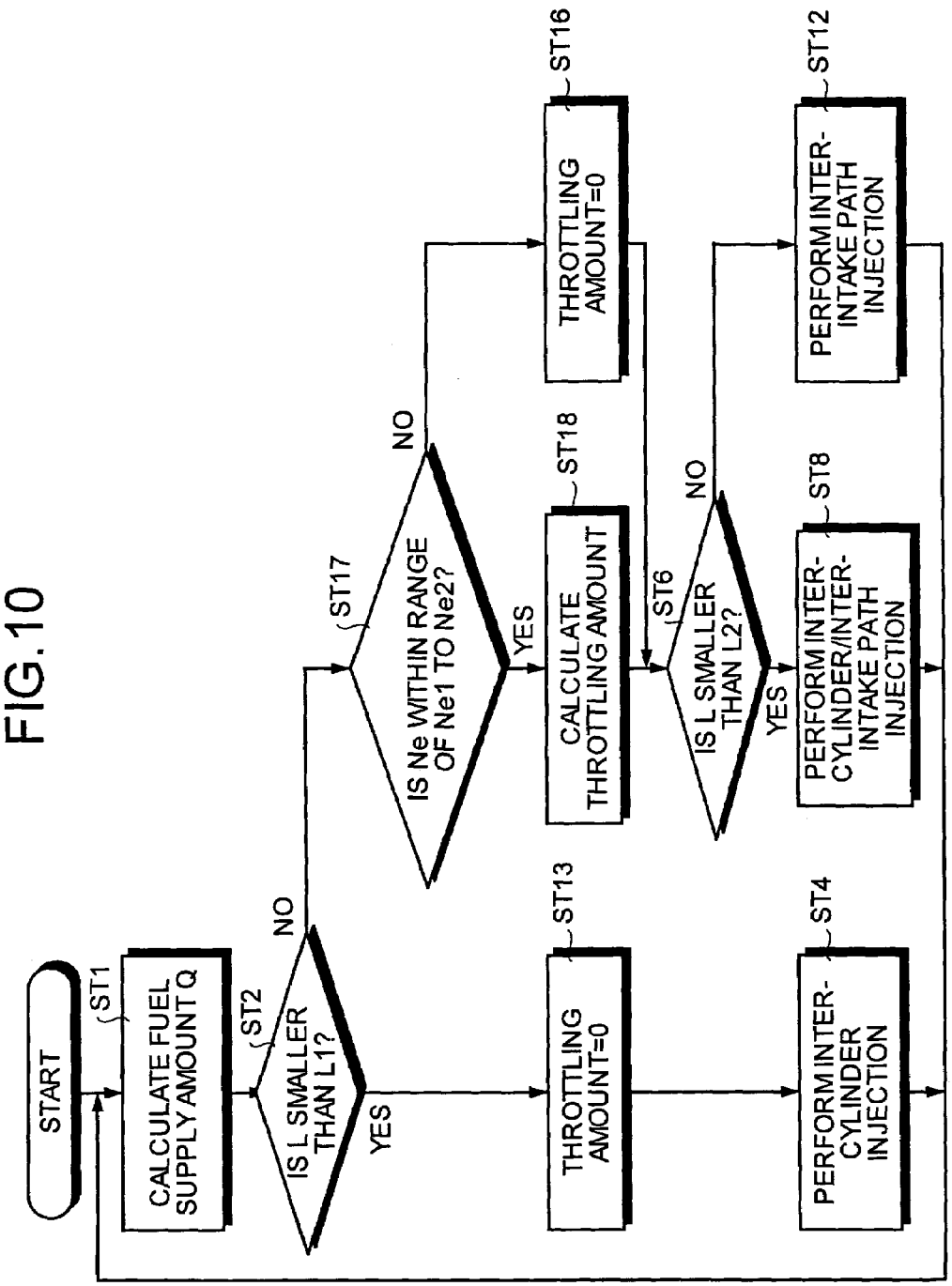
FIG. 10 is a flow chart of another injection control of the fuel injecting apparatus according to the third embodiment.
Figure 11:
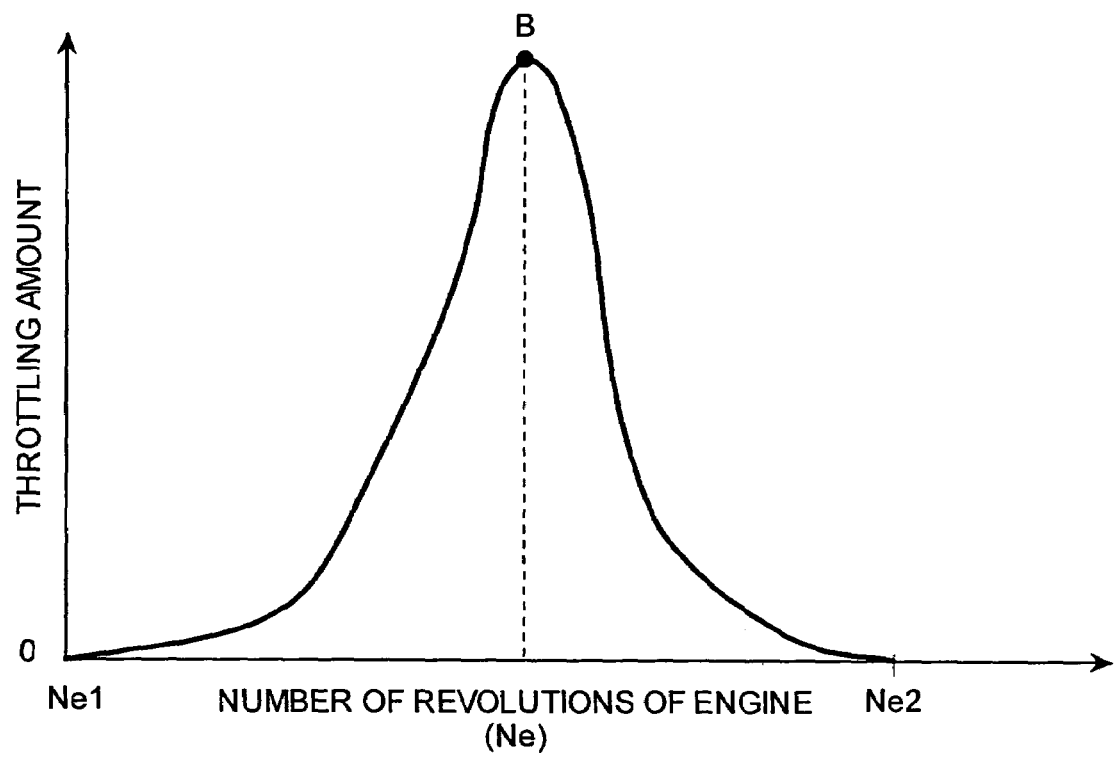
FIG. 11 is a map that represents a relationship between a throttling mount of a variable throttle and the number of revolutions of the engine.

Another fuel injecting method of the fuel injecting apparatus 1-3 will be explained. FIG. 9 is a diagram for explaining a relationship between a width of a fluctuation in the pressure of a fuel and the number of revolutions of the engine. FIG. 10 is a flow chart of another injection control of the fuel injecting apparatus according to the third embodiment. FIG. 11 is a map that represents a relationship between a throttling amount of a variable throttle and the number of revolutions of the engine. The fuel injecting method based on the number of revolutions Ne of the engine as the operating state of the fuel supplying apparatus 1-3 will be explained. The fuel injecting method of the fuel injecting apparatus 1-3 shown in FIG. 10 is basically equal in flow to that of the fuel injecting apparatus 1-3 shown in FIG. 8. Therefore, the fuel injecting method will be explained simply herein.

As shown in FIG. 9, the magnitude of the pulsation generated in the high-pressure pump 9 is increased in proportion to an increase in the number of revolutions Ne of the engine. Namely, the width of the fluctuation in the pressure of the fuel in the high-pressure pump 9 is increased. This is because the cam 9a that drives the high-pressure pump 9, i.e., that reciprocates the plunger of the high-pressure pump 9 is rotated when the crankshaft of the engine is rotated. On the other hand, when the pulsation generated in the high-pressure pump 9 is propagated to the inter-intake path fuel injection mechanism 3 through the branch path 10a of the second fuel supply system 10 and the low-pressure path 8a of the first fuel supply system 8, the pulsation in this inter-intake path fuel injection mechanism 3 exhibits a different characteristic from that of the pulsation in the high-pressure pump 9. Specifically, the pulsation is large, that is, the width of the fluctuation in the pressure of the fuel in the inter-intake path fuel injection mechanism 3 is large until the number of revolutions Ne of the engine reaches a predetermined number of revolutions of the engine. In addition, at the predetermined number of revolutions Ne of the engine, the magnitude of the pulsation reaches a peak, that is, the width of the fluctuation in the pressure of the fuel in the inter-intake path fuel injection mechanism 3 reaches a peak B. When the number of revolutions Ne of the engine exceeds this predetermined number of revolutions of the engine, then the pulsation is smaller, that is, the width of the fluctuation in the pressure of the fuel in the inter-intake path fuel injection mechanism 3 is smaller. Accordingly, at the predetermined number of revolutions of the engine, the magnitude of the pulsation in the inter-intake path fuel injection mechanism 3, that is, the width of the fluctuation in the pressure of the fuel in the inter-intake path fuel injection mechanism 3 is a maximum. The predetermined number of revolutions of the engine, at which the width of the fluctuation in the pressure of the fuel in the inter-intake path fuel injection mechanism 3 is the maximum, is determined by a path length from the high-pressure pump 9 to the inter-intake path fuel injection mechanism 3. Another injection control flow of the fuel injecting apparatus shown in FIG. 10 is intended to control the throttling amount of the variable throttle 8c to be a maximum at the predetermined number of revolutions of the engine at which the width of the fluctuation in the pressure of the fuel in the inter-intake path fuel injection mechanism 3 reaches the peak B by the pulsation propagated from the high-pressure pump 9 to the inter-intake path fuel injection mechanism 3 that serves as the first fuel injection mechanism.

As shown in FIG. 10, the processing unit 5b of the injection controller 5 calculates the fuel supply amount Q to be supplied to the engine (at a step ST1). The processing unit 5b determines whether the accelerator opening L is smaller than the predetermined value L1 (at a step ST2). When the accelerator opening L is smaller than the predetermined value L1, the injection controller 5 that serves as the control unit determines that a fuel injection range is an inter-cylinder injection range based on the operating state of the engine that serves as the internal combustion engine, as shown in FIG. 4. The processing unit 5b outputs the output signal for controlling the throttling amount of the variable throttle 8c at zero, that is, the output signal so as not to throttle the variable throttle 8c, to this variable throttle 8c (at a step ST13). The processing unit 5b then outputs the output signals for the injection timings and the injection amounts to the inter-cylinder injectors 4a to 4d of the inter-cylinder fuel injection mechanism 4 in order to supply the fuel that satisfies the fuel supply amount Q to the engine, and the fuel injecting apparatus 1-3 performs inter-cylinder injection (at a step ST4).

When the accelerator opening L is equal to or larger than the predetermined value L1 at the step ST2, the processing unit 5b determines whether the present number of revolutions Ne of the engine is within a range between the numbers of revolutions Ne1 and Ne2 of the engine in the map stored in the storage unit 5c and shown in FIG. 11 (at a step ST17). According to the map shown in FIG. 11, when the width of the fluctuation in the pressure of the fuel in the inter-intake path fuel injection mechanism 3 is increased by the pulsation propagated from the high-pressure pump 9 to the inter-intake path fuel injection mechanism 3, the throttling amount of the variable throttle 8c is increased. When the width of the fluctuation in the pressure of the fuel is reduced, the throttling amount of the variable throttle 8c is reduced. In addition, according to the map shown in FIG. 11, the number of revolutions of the engine when the width of the fluctuation in the pressure of the fuel in the inter-intake path fuel injection mechanism 3 is caused by the pulsation propagated from the high-pressure pump 9 to the inter-intake path fuel injection mechanism 3 is set at Ne1. The number of revolutions of the engine at the timing of that the width of the fluctuation in the pressure of the fuel ends is set at Ne2. When the present number of revolutions Ne of the engine is within the range between the numbers of revolutions Ne1 and Ne2 of the engine at the step ST17, the processing unit 5b calculates the throttling amount of the variable throttle 8c based on the map shown in FIG. 11, and outputs an output signal for the throttling amount to the variable throttle 8c (at a step ST18). When the present number of revolutions Ne of the engine is out of the range between the numbers of revolutions Ne1 and Ne2, the processing unit 5b outputs a control signal for setting the throttling amount of the variable throttle 8c at zero, that is, an output signal so as not to throttle the variable throttle 8c, to this variable throttle 8c (at a step ST16).

After the throttling amount of the variable throttle 8c is controlled, the processing unit 5b determines whether the accelerator opening L is smaller than the predetermined value L2 (at a step ST6). When the accelerator opening L is smaller than the predetermined value L2, the injection controller 5 that serves as the control unit determines that the injection range is the inter-cylinder and inter-intake path injection range, as shown in FIG. 4. The processing unit 5b outputs the output signals for the injection timings and the injection amounts to the inter-intake path injectors 3a to 3d of the inter-intake path fuel injection mechanism 3 and the inter-cylinder injectors 4a to 4d of the inter-cylinder fuel injection mechanism 4 in order to supply the fuel that satisfies the fuel supply amount Q to the engine, and the fuel injecting apparatus 1-3 performs inter-cylinder and inter-intake path injection (at a step ST8). The pulsation generated in the high-pressure pump 9 is propagated to the low-pressure path 8a of the first fuel supply system 8 through the branch path 10a of the second fuel supply system 10. At this time, the magnitude of the variable throttle 8c of the low-pressure path 8a is increased in proportion to the operating state of the engine, that is, the number of revolutions of the engine at which the width of the fluctuation in the pressure of the fuel in the inter-intake path fuel injection mechanism 3 occurs. Therefore, the magnitude of the pulsation propagated to the inter-intake path fuel injection mechanism 3 is reduced. Namely, the pulsation propagated to the low-pressure path 8a downstream of this variable throttle 8c and the inter-intake path fuel injection mechanism 3 that serves as the first fuel injection mechanism, that is, the width of the fluctuation in the pressure of the fuel in the inter-intake path fuel injection mechanism 3 is smaller than a width of a fluctuation in the pressure of the fuel upstream of the variable throttle 8c. Accordingly, in the inter-cylinder and inter-intake path injection for supplying the fuel to the engine by both the first fuel injection mechanism and the second fuel injection mechanism, the propagation of the pulsation generated in the high-pressure pump 9 to the inter-intake path fuel injection mechanism 3 can be suppressed. The injection amount of the fuel injected from the inter-intake path injectors 3a to 3d can be similarly, therefore, made substantially equal to the fuel supply amount Q.

When the acceleration opening L is equal to or larger than the predetermined value L2 at the step ST6, the injection controller 5 that serves as the control unit determines that the injection range is an inter-intake path injection range as shown in FIG. 4. The processing unit 5b outputs the output signals for the injection timings and the injection amounts to the inter-intake path injectors 3a to 3d of the inter-intake path fuel injection mechanism 3 in order to supply the fuel that satisfies the fuel supply amount Q to the engine, and the fuel injecting apparatus 1-3 performs inter-intake path injection (at a step ST12). The pulsation generated in the high-pressure pump 9 is propagated to the low-pressure path 8a of the first fuel supply system 8 through the branch path 10a of the second fuel supply system 10. At this time, the throttle amount of the variable throttle 8c of the low-pressure path 8a is increased in proportion to the operating state of the engine, that is, based on the number of revolutions of the engine at which the width of the fluctuation in the pressure of the fuel in the inter-intake path fuel injection mechanism 3 occurs. Therefore, the magnitude of the pulsation propagated to the inter-intake path fuel injection mechanism 3 is reduced. Namely, the pulsation propagated to the low-pressure path 8a downstream of this variable throttle 8c and the inter-intake path fuel injection mechanism 3 that serves as the first fuel injection mechanism, that is, the width of the fluctuation in the pressure of the fuel in the inter-intake path fuel injection mechanism 3 is smaller than a width of a fluctuation in the pressure of the fuel upstream of the variable throttle 8c. Accordingly, in the inter-cylinder and inter-intake path injection for supplying the fuel to the engine only by the first fuel injection mechanism, the propagation of the pulsation generated in the high-pressure pump 9 to the inter-intake path fuel injection mechanism 3 can be suppressed. The injection amount of the fuel injected from the inter-intake path injectors 3a to 3d can be similarly, therefore, made substantially equal to the fuel supply amount Q. Thus, by suppressing the propagation of the pulsation generated in the high-pressure pump 9 to the inter-intake path fuel injection mechanism 3, the influence of the pulsation generated in the high-pressure pump 9 on the fuel supply amount by which the fuel is supplied into the engine, particularly, the fuel injection amount by which the fuel is injected from the inter-intake path injectors 3a to 3d of the inter-intake path fuel injection mechanism 3 that serves as the first fuel injection mechanism can be lessened.

At the step ST16, when the processing unit 5b outputs the output signal for setting the throttling amount of the variable throttle 8c at zero to the variable throttle 8c, the processing unit 5b determines whether the accelerator opening L is smaller than the predetermined value L2 (at a step ST6). When the accelerator opening L is smaller than the predetermined value L2, the fuel injecting apparatus 1-3 performs inter-cylinder and inter-intake path injection (at a step ST8). When the accelerator opening L is equal to or larger than the predetermined value L2, the fuel injecting apparatus 1-3 performs inter-intake path injection (at a step ST12).

Figure 12:
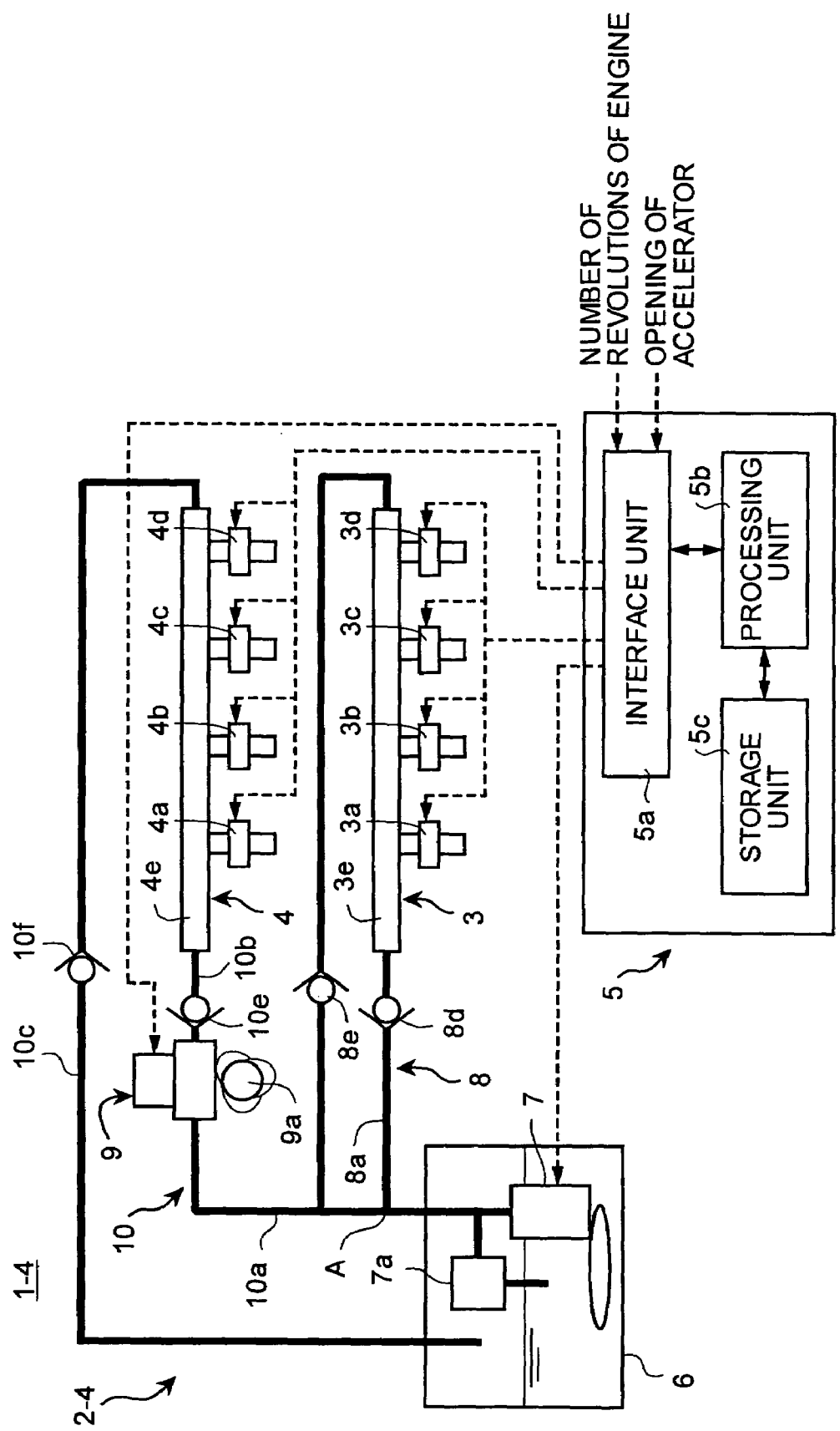
FIG. 12 is a configuration diagram of a fuel injecting apparatus including fuel supplying apparatus according to a fourth embodiment.

FIG. 12 is a configuration diagram of a fuel injecting apparatus including a fuel supplying apparatus according to a fourth embodiment. A fuel injecting apparatus 1-4 shown in FIG. 12 differs from the fuel injecting apparatus 1-1 shown in FIG. 1 in that a fuel supplying apparatus 2-4 includes a check valve 8d in stead of the shutoff valve 10d. Since the basic configuration of the fuel injecting apparatus 1-4 shown in FIG. 12 is the same as that of the fuel injecting apparatus 1-1 shown in FIG. 1, the explanation of the basic configuration of the fuel injecting apparatus 1-4 will be omitted. Furthermore, since the fuel injecting method of the fuel injecting apparatus 1-4 is the same as the fuel injecting method of the fuel injecting apparatus 1-2 shown in FIG. 6, the explanation therefor will also be omitted.

The check valve 8d that serves as a pulsation propagation suppressing unit is provided between the branch part A at which the second fuel supply system 10 is branched and the inter-intake path fuel injection mechanism 3 that serves as the first fuel injection mechanism. Reference numeral 8e denotes a safety valve that prevents an excessive pressure rise of the fuel in the inter-intake path fuel injection mechanism 3.

Figure 13A:
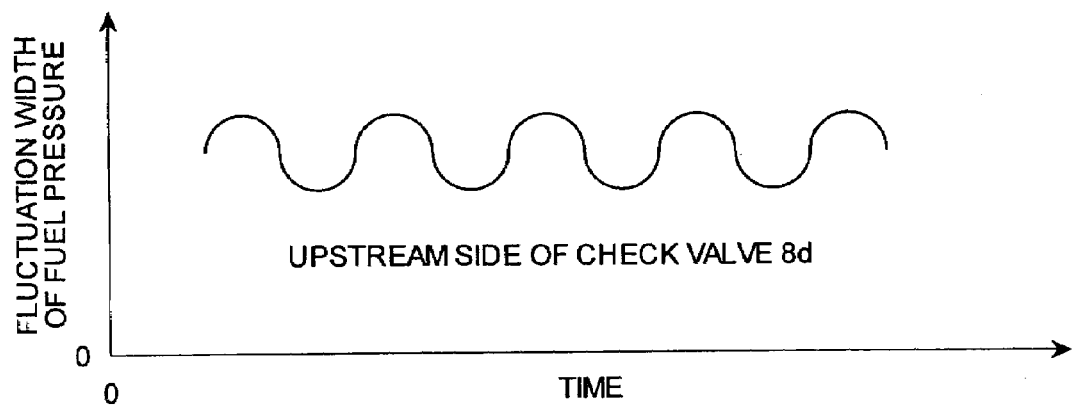
FIG. 13A is a diagram for explaining a width of a fluctuation in the pressure of the fuel in a low-pressure path upstream of a check valve.
Figure 13B:
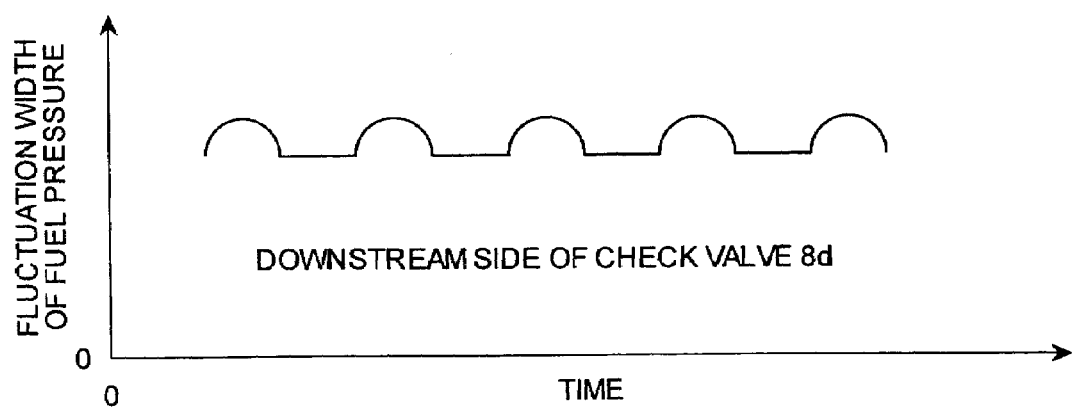
FIG. 13B is a diagram for explaining a width of a fluctuation in the pressure of the fuel in the low-pressure path downstream of the check valve.

FIG. 13A is a diagram for explaining a width of a fluctuation in the pressure of the fuel in a low-pressure path upstream of a check valve. FIG. 13B is a diagram for explaining a width of a fluctuation in the pressure of the fuel in the low-pressure path downstream of the check valve. As shown in FIG. 13A, the width of the fluctuation in the pressure of the fuel in the low-pressure path 8a due to the pulsation propagated from the high-pressure pump 9 to the low-pressure path 8a of the first fuel supply system 8 forms a curve on which an upper limit and a lower limit appear at constant intervals. The check valve 8d is not opened unless an upstream fuel pressure is higher than a downstream fuel pressure. Therefore, the fuel pressure in the inter-intake path fuel injection mechanism 3 downstream of the check valve 8d is kept at a constant higher pressure than that of the fuel in the low-pressure path 8a upstream of the check valve 8d. This constant higher pressure is a pressure near the upper limit of the width of the fluctuation in the pressure of the fuel in the low-pressure path 8a upstream of the check valve 8d due to the pulsation propagated from the high-pressure pump 9 to the low-pressure path 8a that constitutes the first fuel supply system 8. That is, as shown in FIG. 13B, the width of the fluctuation in the pressure of the fuel in the inter-intake path fuel supply mechanism 3 is only near the upper limit of the fluctuation in the pressure of the fuel in the low-pressure path 8a upstream of the check valve 8d. Therefore, when the fuel injecting apparatus 1-4 performs inter-cylinder and inter-intake path injection or inter-intake path injection, the injection amount of the fuel from the inter-intake path injectors 3a to 3d of the inter-intake path fuel injection mechanism 3 that serves as the first fuel injection mechanism can be made substantially equal to the fuel supply amount Q. This is because the propagation of the pulsation generated in the high-pressure pump 9 to the inter-intake path fuel injection mechanism 3 can be suppressed. Thus, by suppressing the propagation of the pulsation generated in the high-pressure pump 9 to the inter-intake path fuel injection mechanism 3, the influence of the pulsation generated in the high-pressure pump 9 on the fuel supply amount by which the fuel is supplied into the engine, particularly, the fuel injection amount by which the fuel is injected from the inter-intake path injectors 3a to 3d of the inter-intake path fuel injection mechanism 3 that serves as the first fuel injection mechanism can be lessened. In addition, as explained above, since the pressure of the fuel in the inter-intake path fuel injection mechanism 3 is kept at the constant higher pressure, the fuel injected from the inter-intake path injectors 3a to 3d of the inter-intake path fuel injection mechanism 3 can be transformed to fine particles. Thus, combustion efficiency and an emission of the engine can be enhanced.

In the fuel injecting apparatus 1-4, the driving of the low-pressure pump may be stopped. As already explained, the check valve 8d is not opened unless the pressure of the fuel in the low-pressure path 8a of the first fuel supply system 8 upstream of the check valve 8d is higher than that of the fuel in the inter-intake path fuel injection mechanism 3 downstream of the check valve 8d. Therefore, when the fuel in the inter-intake path fuel-injection mechanism 3 is kept at the constant higher pressure and the flow rate of the fuel is low, the fuel can be supplied into the inter-cylinder fuel injection mechanism 4 that serves as the second fuel injection mechanism by driving the high-pressure pump 9. In other words, even if the driving of the low-pressure pump 7 is stopped, the fuel can be supplied into the inter-cylinder fuel injection mechanism 4 that serves as the second fuel injection mechanism by the high-pressure pump 9 when the fuel injecting apparatus 1-4 performs inter-cylinder injection. A power consumption required when driving the low-pressure pump 7 can be thereby reduced.

Figure 14:
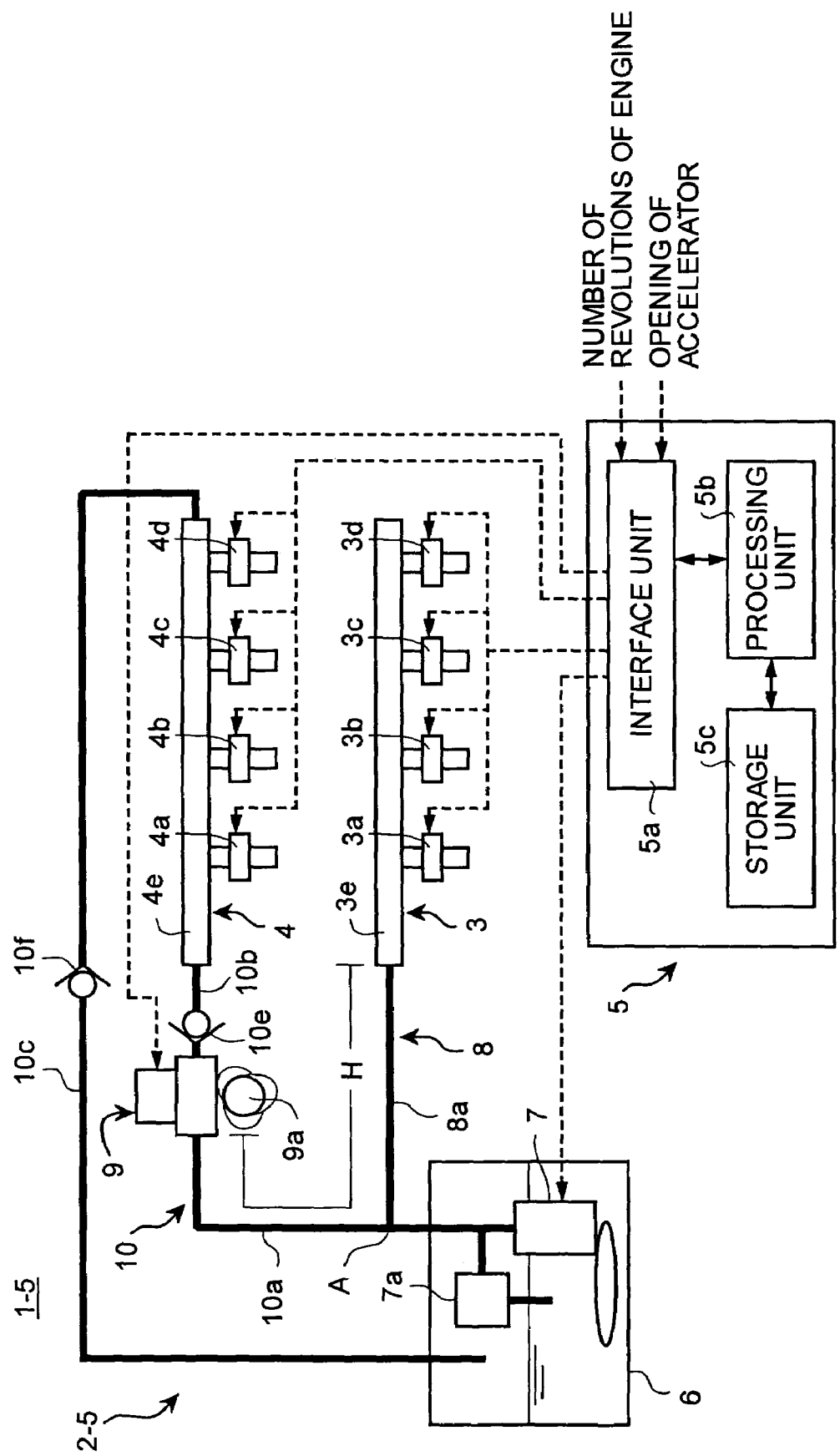
FIG. 14 is a configuration diagram of a fuel injecting apparatus that includes a fuel supplying apparatus according to a fifth embodiment.

FIG. 14 is a configuration diagram of a fuel injecting apparatus that includes a fuel supplying apparatus according to a fifth embodiment. A fuel injecting apparatus 1-5 shown in FIG. 14 differs from the fuel injecting apparatus 1-1 shown in FIG. 1 in that a fuel supplying apparatus 2-5 does not include the shutoff valve 10d. Since the basic configuration of the fuel injecting apparatus 1-4 shown in FIG. 14 is the same as that of the fuel injecting apparatus 1-1 shown in FIG. 1, the explanation of the basic configuration of the fuel injecting apparatus 1-4 will be omitted. Furthermore, since the fuel injecting method of the fuel injecting apparatus 1-5 is the same as the fuel injecting method of the fuel injecting apparatus 1-2 shown in FIG. 6, the explanation therefor will also be omitted.

As already explained, the predetermined number of revolutions of the engine at which the pulsation propagated from the high-pressure pump 9 to the inter-intake path fuel injection mechanism 3 is increased, i.e., the width of the fluctuation in the pressure of the fuel in the inter-intake path fuel injection mechanism 3 is the maximum is determined by the path length from the high-pressure pump 9 to the inter-intake path fuel injection mechanism 3. When this path length is set long, in particular, the predetermined number of revolutions of the engine at which the width of the fluctuation in the pressure of the fuel in the inter-intake path fuel injection mechanism 3 is the maximum is a small number.

A fuel injecting apparatus 1-5 shown in FIG. 14 set a path length H from the high-pressure pump 9 to the inter-intake path fuel injection mechanism 3 that serves as the first fuel injection mechanism so that the predetermined number of revolutions of the engine, at which the pulsation propagated from the high-pressure pump 9 to the inter-intake path fuel injection mechanism 3 is increased, that is, the width of the fluctuation in the pressure of the fuel in inter-intake path fuel injection mechanism 3 is the maximum, is out of a common range of the number of revolutions of the engine, e.g., 500 to 7000 rpm. Namely, at the common range of the number of revolutions of the engine at which the fuel injecting apparatus 1-5 performs inter-cylinder and inter-intake path fuel injection or inter-intake path fuel injection, the pulsation propagated from the high-pressure pump 9 to the inter-intake path fuel injection mechanism 3 is not increased. In other words, the width of the fluctuation in the pressure of the fuel in the inter-intake path fuel injection mechanism 3 is not the maximum. Accordingly, when the fuel injecting apparatus 1-5 performs inter-cylinder and inter-intake path fuel injection or inter-intake path fuel injection, the injection amount of the fuel from the inter-intake path injectors 3a to 3d of the inter-intake path fuel injection mechanism 3 can be made substantially equal to the fuel supply amount Q. This is because the propagation of the pulsation from the high-pressure pump 9 to the inter-intake path fuel injection mechanism 3 can be suppressed. The influence of the pulsation generated in the high-pressure pump 9 on the fuel supply amount by which the fuel is supplied to the engine, particularly, the fuel injection amount by which the fuel is injected from the inter-intake path injectors 3a to 3d of the inter-intake path fuel injection mechanism 3 that serves as that first fuel injection mechanism can be thereby lessened.

It is noted that the path length H is a combination of a length of the branch path 10a of the second fuel supply system 10 and that of the low-pressure path 8a that constitutes the first fuel supply system 8 from the part A at which the second fuel supply system 10 is branched to the inter-intake path fuel injection mechanism 3.

The path length H is preferably set such that the predetermined number of revolutions of the engine, at which the pulsation propagated from the high-pressure pump 9 to the inter-intake path fuel injection mechanism 3 is increased, that is, the width of the fluctuation in the pressure of the fuel in inter-intake path fuel injection mechanism 3 is the maximum, is smaller than the number of revolutions during idling in the common range of the number of revolutions of the engine. This is because the path length from the high-pressure pump 9 to the inter-intake path fuel injection mechanism 3 can be easily set large.

Figure 15:
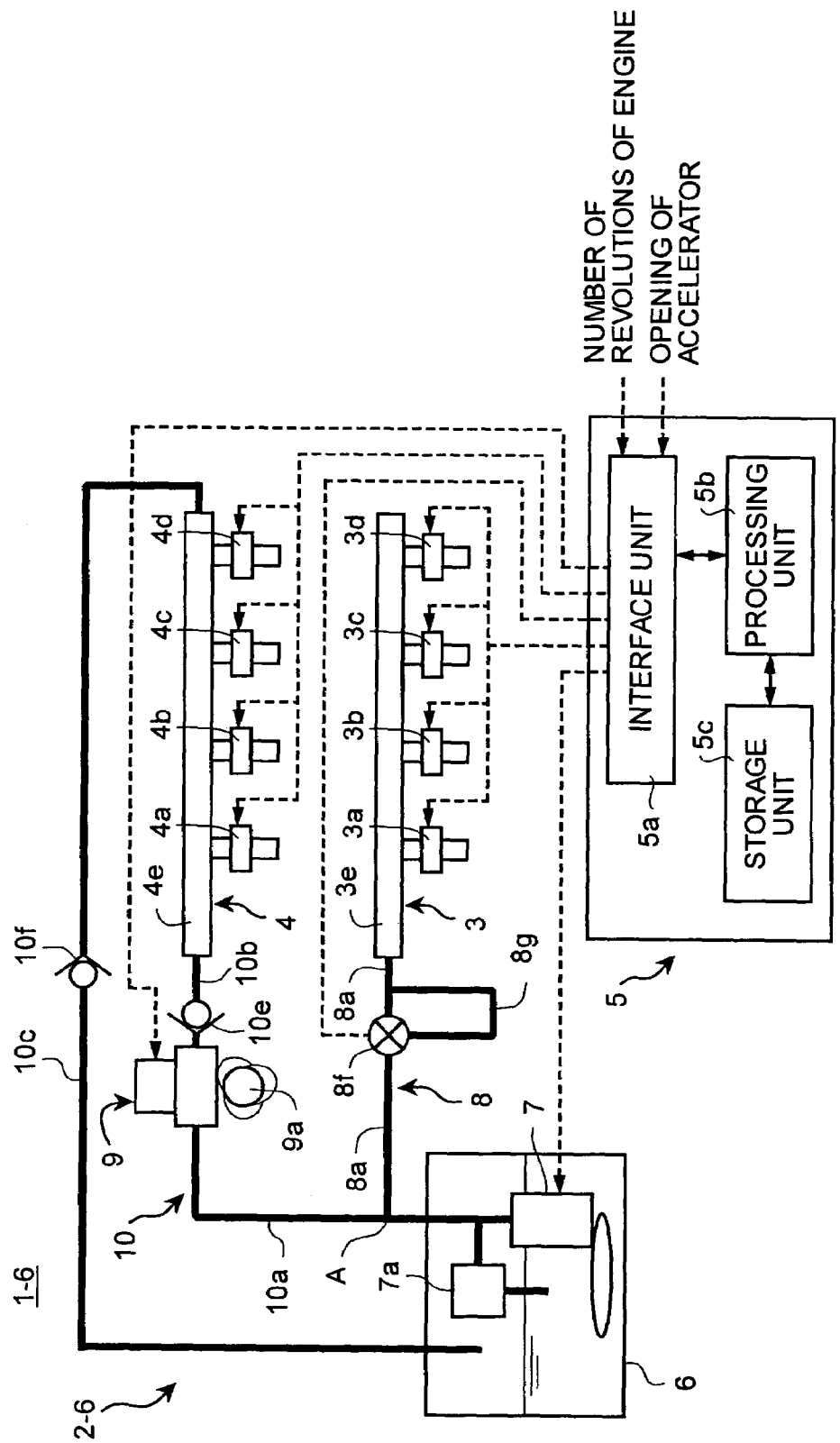
FIG. 15 is a configuration diagram of a fuel injecting apparatus including a fuel supplying apparatus according to a sixth embodiment.
Figure 16:
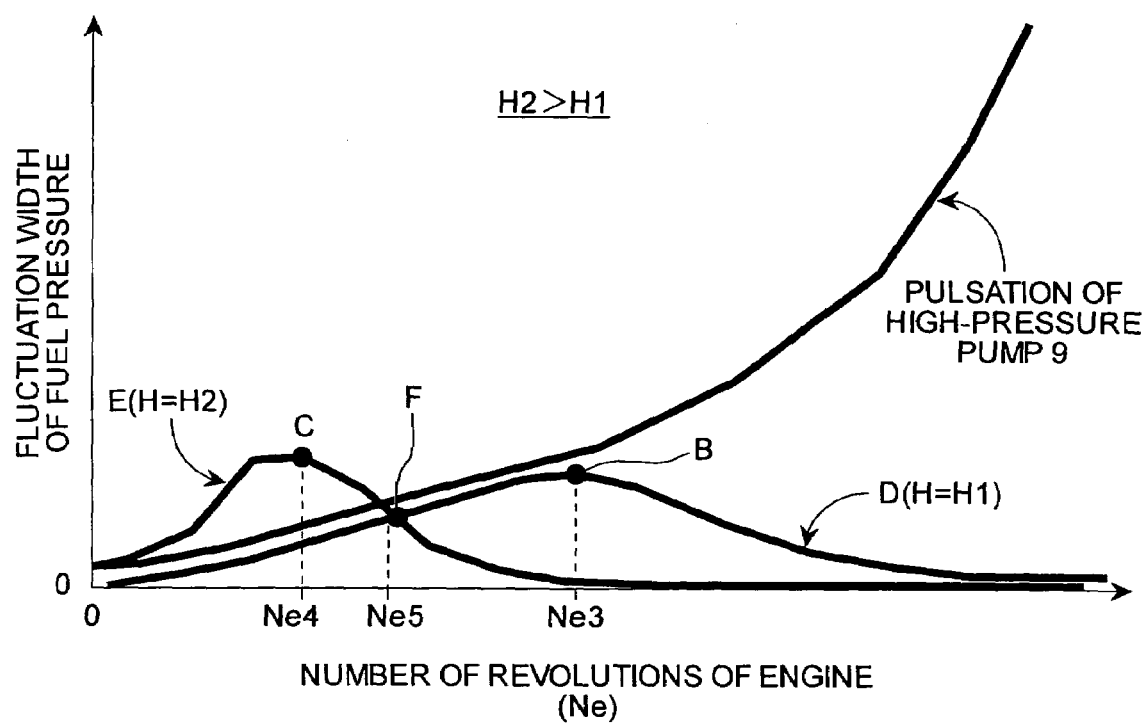
FIG. 16 is a diagram for explaining a relationship between the width of a fluctuation in the pressure of the fuel and the number of revolutions of the engine.

FIG. 15 is a configuration diagram of a fuel injecting apparatus including a fuel supplying apparatus according to a sixth embodiment. FIG. 16 is a diagram for explaining a relationship between the width of a fluctuation in the pressure of the fuel and the number of revolutions of the engine. A fuel injecting apparatus 1-6 shown in FIG. 15 differs from the fuel injecting apparatus 1-1 shown in FIG. 1 in that a fuel supplying apparatus 2-6 includes a switching valve 8f and an extension path 8g in stead of the shutoff valve 10d. Since the basic configuration of the fuel injecting apparatus 1-6 shown in FIG. 15 is the same as that of the fuel injecting apparatus 1-1 shown in FIG. 1, the explanation of the basic configuration of the fuel injecting apparatus 1-6 will be omitted.

The switching valve 8f and the extension path 8g that serve as a pulsation generating number-of-revolution change unit is provided between the part A at which the second fuel supply system 10 is branched and the inter-intake path fuel injection mechanism 3 that serves as the first fuel injection mechanism. The switching valve 8f switches over between direct supply by the low-pressure path 8a downstream of the switching valve 8f and supply through the extension path 8 when the fuel in the low-pressure path 8a upstream of the switching valve 8f is supplied to the inter-intake path fuel injection mechanism 3 that serves as the first fuel injection mechanism. It is noted that a switching of the switching valve 8f is controlled by an output signal from the injection controller 5.

It is assumed herein that the path length H from the high-pressure pump 9 to the inter-intake path fuel injection mechanism 3 when the switching valve 8f switches over to the direct supply of the fuel by the low-pressure path 8a downstream of the witching valve 8f is H1. It is also assumed herein that the path length H from the high-pressure pump 9 to the inter-intake path fuel injection mechanism 3 when the switching valve 8f switches over to the supply of the fuel through the extension path 8g is H2. If so, the path length H2 is longer than H1. When the path length H is H1, a characteristic of the width of the fluctuation in the pressure of the fuel in the inter-intake path fuel injection mechanism 3 caused by the pulsation propagated from the high-pressure pump 9 to the inter-intake path fuel injection mechanism 3 is represented by D shown in FIG. 16. The predetermined number of revolutions of the engine at which the pulsation propagated from the high-pressure pump 9 to the inter-intake path fuel injection mechanism 3 is increased, that is, the width of the fluctuation in the pressure is a peak B is Ne3. On the other hand, when the path length H is H2, a characteristic of the width of the fluctuation in the pressure of the fuel in the inter-intake path fuel injection mechanism 3 caused by the pulsation propagated from the high-pressure pump 9 to the inter-intake path fuel injection mechanism 3 is represented by E shown in FIG. 16. The predetermined number of revolutions of the engine at which the pulsation propagated from the high-pressure pump 9 to the inter-intake path fuel injection mechanism 3 is increased, that is, the width of the fluctuation in the pressure is a peak C is Ne4 that is lower than the predetermined number of revolutions Ne3 of the engine. This is because the path length H2 is longer than H1. Namely, by switching the path length from the high-pressure pump 9 to the inter-intake path fuel injection mechanism 3 that serves as the first fuel injection mechanism by using the switching valve 8f, the number of revolutions of the engine at which the pulsation propagated from the high-pressure pump 9 to the inter-intake path fuel injection mechanism 3 is increased can be changed.

Figure 17:
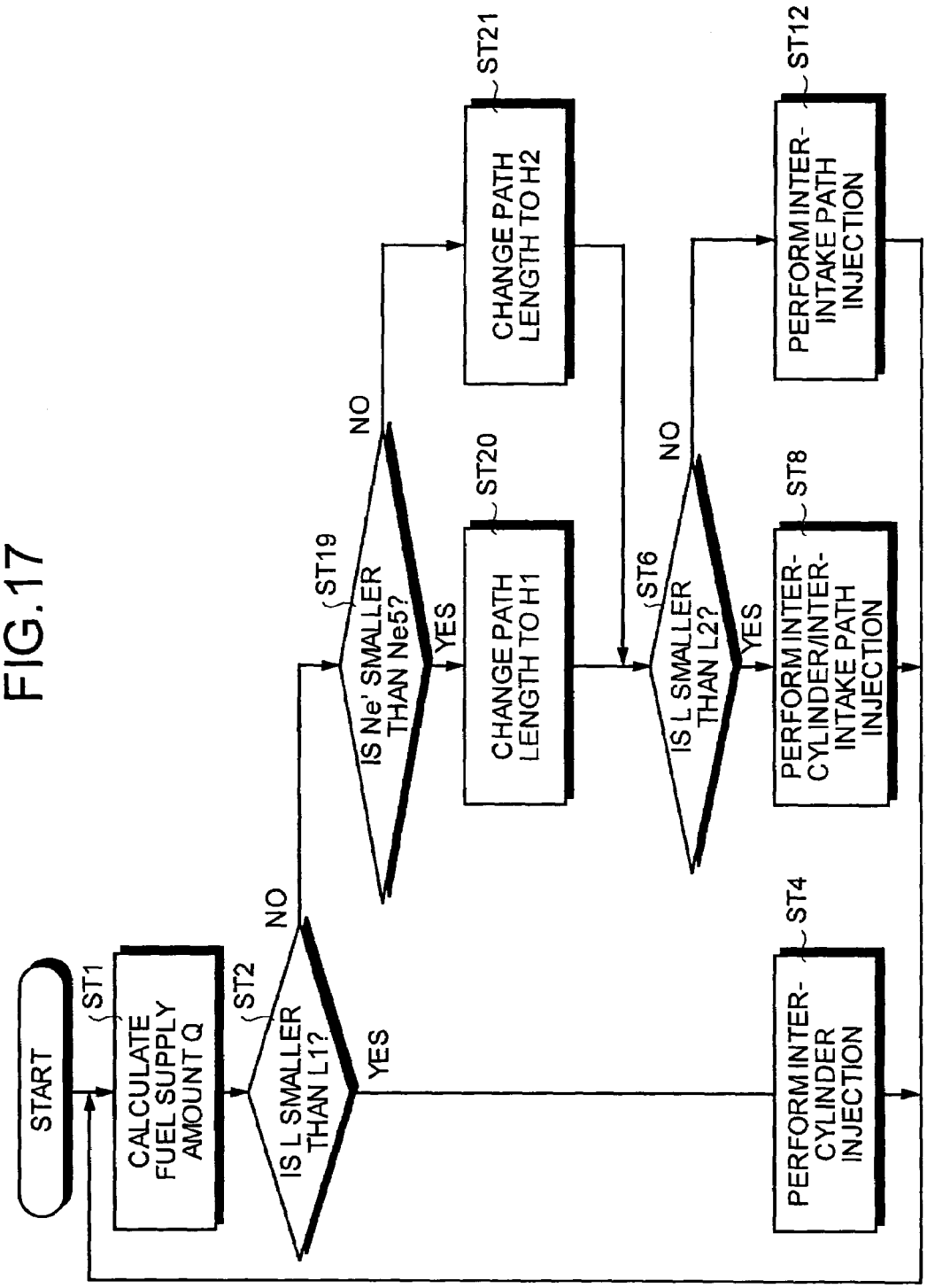
FIG. 17 is a flow chart of injection control of a fuel injecting apparatus according to a sixth embodiment.

A fuel injecting method performed by the fuel injecting apparatus 1-6 will next be explained. FIG. 17 is a flow chart of injection control of a fuel injecting apparatus according to a sixth embodiment. The flow of the fuel injecting method of the fuel injecting apparatus 1-6 shown in FIG. 17 is basically the same as that of the fuel injecting method of the fuel injecting apparatus 1-2 shown in FIG. 6. Therefore, the flow will be explained simply. As shown in FIG. 17, the processing unit 5b of the fuel controller 5 calculates the fuel supply amount Q supplied to the engine (at a step ST1).

The processing unit 5b determines whether the accelerator opening L is smaller than the predetermined value L1 (at a step ST2). When the accelerator opening L is smaller than the predetermined value L1, the injection controller 5 that serves as the control unit determines that a fuel injection range is an inter-cylinder injection range based on the operating state of the engine that serves as the internal combustion engine, as shown in FIG. 4. The processing unit 5b then outputs output signals for the injection timings and the injection amounts to the inter-cylinder injectors 4a to 4d of the inter-cylinder fuel injection mechanism 4 of the inter-cylinder fuel injection mechanism 4, and the fuel injecting apparatus 1-6 performs inter-cylinder injection (at a step ST4).

When the accelerator opening L is equal to or larger than the predetermined value L1 at the step ST2, the processing unit 5b determines whether a present number of revolutions Ne' of the engine is smaller than a predetermined value Ne5 (at a step ST19). The present number of revolutions Ne' of the engine is the number of revolutions of the engine input to the injection controller 5. The predetermined value Ne5 is the number of revolutions of the engine at a point F at which the characteristic D of the width of the fluctuation in the pressure of the fuel in the inter-intake path fuel injection mechanism 3 when the path length H is H1 crosses the characteristic E of the width of the fluctuation in the pressure of the fuel in the inter-intake path fuel injection mechanism 3 when the path length H is H2 as shown in FIG. 16. When the present number of revolutions Ne' of the engine is smaller than the predetermined value Ne5, the processing unit 5b changes the path length H from the high-pressure pump 9 to the inter-intake path fuel injection mechanism 3 to H1 (at a step ST20). Namely, the processing unit 5b outputs an output signal to the switching valve 8f so that the fuel in the low-pressure path 8a upstream of the switching valve 8f can be supplied to the inter-intake path fuel injection mechanism 3 directly from the low-pressure path 8a downstream of the switching valve 8f. When the present number of revolutions Ne' of the engine is equal to or larger than the predetermined value Ne5, the processing unit 5b changes the path length H from the high-pressure pump 9 to the inter-intake path fuel injection mechanism 3 to H2 (at a step ST21). Namely, the processing unit 5b outputs an output signal to the switching valve 8f so that the fuel in the low-pressure path 8a upstream of this switching valve 8f can be directly supplied to the inter-intake path fuel injection mechanism 3 through the extension path 8g. In other words, the path length is changed so that the number of revolutions of the engine at which the pulsation propagated from the high-pressure pump 9 to the inter-intake path fuel injection mechanism 3 is increased, i.e., the width of the fluctuation in the pressure of the fuel in the inter-intake path fuel injection mechanism 3 reaches a peak, is out of the present number of revolutions of the internal combustion engine.

After the switching valve 8f switches the path length H from the high-pressure pump 9 to the inter-intake path fuel injection mechanism 3, the processing unit 5b determines whether the accelerator opening L is smaller than the predetermined value L2 (at a step ST6). When the accelerator opening L is smaller than the predetermined value L2, the injection controller 5 that serves as the control unit determines that the injection range is an inter-cylinder and inter-intake path injection range as shown in FIG. 4. The processing unit 5b outputs the output signals for the injection timings and the injection amounts to the inter-intake path injectors 3a to 3d of the inter-intake path fuel injection mechanism 3 and the inter-cylinder injectors 4a to 4d of the inter-cylinder fuel injection mechanism 4 in order to supply the fuel that satisfies the fuel supply amount Q to the engine, and the fuel injecting apparatus 1-6 performs inter-cylinder and inter-intake path injection (at a step ST8). The pulsation generated in the high-pressure pump 9 is propagated to the inter-intake path fuel injection mechanism 3. At this time, the path length H from the high-pressure pump 9 to the inter-intake path fuel injection mechanism 3 is switched to either the path length H1 or H2 by the switching valve 8f so that the pulsation propagated from the high-pressure pump 9 to the inter-intake path fuel injection mechanism 3 is reduced, i.e., the width of the fluctuation in the pressure of the fuel in the inter-intake path fuel injection mechanism 3 is reduced at the present number of revolutions Ne' of the engine. Therefore, the pulsation propagated to the inter-intake path fuel injection mechanism 3 is reduced. Accordingly, even in the inter-cylinder and inter-intake path injection for supplying the fuel to the engine by both the first fuel injection mechanism and the second fuel injection mechanism, the propagation of the pulsation generated in the high-pressure pump 9 to the inter-intake path fuel injection mechanism 3 can be suppressed. The injection amount of the fuel injected from the inter-intake path injectors 3a to 3d can be, therefore, made substantially equal to the fuel supply amount Q.

When the acceleration opening L is equal to or larger than the predetermined value L2 at the step ST6, the injection controller 5 that serves as the control unit determines that the injection range is the inter-intake path injection range, as shown in FIG. 4. The processing unit 5b outputs the output signals for the injection timings and the injection amounts to the inter-intake path injectors 3a to 3d of the inter-intake path fuel injection mechanism 3 in order to supply the fuel that satisfies the fuel supply amount Q to the engine, and the fuel injecting apparatus 1-6 performs inter-intake path injection (at a step ST12). At this time, the pulsation generated in the high-pressure pump 9 is propagated to the inter-intake path fuel injection mechanism 3. If so, the path length H from the high-pressure pump 9 to the inter-intake path fuel injection mechanism 3 is switched to either the path length H1 or H2 by the switching valve 8f so that the pulsation propagated from the high-pressure pump 9 to the inter-intake path fuel injection mechanism 3 is reduced, i.e., the width of the fluctuation in the pressure of the fuel in the inter-intake path fuel injection mechanism 3 is reduced at the present number of revolutions Ne' of the engine. Therefore, the pulsation propagated to the inter-intake path fuel injection mechanism 3 is reduced. Accordingly, in the inter-intake path injection for supplying the fuel to the engine only by the first fuel injection mechanism, the propagation of the pulsation generated in the high-pressure pump 9 to the inter-intake path fuel injection mechanism 3 can be suppressed. The injection amount of the fuel injected from the inter-intake path injectors 3a to 3d can be, therefore, made substantially equal to the fuel supply amount Q. Thus, by suppressing the propagation of the pulsation generated in the high-pressure pump 9 to the inter-intake path fuel injection mechanism 3, the influence of the pulsation generated in the high-pressure pump 9 on the fuel supply amount by which the fuel is supplied into the engine, particularly, the fuel injection amount by which the fuel is injected from the inter-intake path injectors 3a to 3d of the inter-intake path fuel injection mechanism 3 that serves as that first fuel injection mechanism can be lessened.

FIG. 18 is a configuration diagram of a fuel injecting apparatus including a fuel supplying apparatus according to a seventh embodiment. A fuel injecting apparatus 1-7 shown in FIG. 18 is a fuel injecting apparatus that includes a fuel supplying apparatus mounted in a V6 engine having six cylinders in a V configuration wherein three cylinders of the six cylinders composes one cylinder group. Each cylinder group is provided in one of left and right banks of the engine. Since the basic configuration of the fuel injecting apparatus 1-7 shown in FIG. 18 is the same as that of the fuel injecting apparatus 1-1 shown in FIG. 1, the basic configuration of the fuel injecting apparatus 1-7 will be explained simply herein. Furthermore, since the fuel injecting method performed by the fuel injecting apparatus 1-7 is the same as fuel injecting method of the fuel injecting apparatus 1-2 shown in FIG. 6, the explanation therefor will be omitted.

As shown in FIG. 18, the fuel injecting apparatus 1-7 according to this embodiment includes a fuel supplying apparatus 2-7, a right inter-intake path fuel injection mechanism 31 and a left inter-intake path fuel injection mechanism 32 that serve as first fuel injection mechanisms, a right inter-cylinder fuel injection mechanism 41 and a left inter-cylinder fuel injection mechanism 42 that serve as second fuel injection mechanisms, and an injection controller 5 that serves as a control unit.

The first fuel supply system 8 of the fuel supplying apparatus 2-7 includes the low-pressure path 8a, a right branch path 8h for supplying a fuel in this low-pressure path 8a from a branch part D to the right inter-intake path fuel injection mechanism 31, and a left branch path 8i for supplying the fuel in this low-pressure path 8a from the branch part D to the left inter-intake path fuel injection mechanism 32. The right branch path 8h differs in path length from the left branch path 8i. That is, a path length from the high-pressure pump 9 to the right inter-intake path fuel injection mechanism 31 that serves as the first fuel injection mechanism differs from a path length from the high-pressure pump 9 to the left inter-intake path fuel injection mechanism 32 that serves as the first fuel injection mechanism. The second fuel supply system 10 includes the branch path 10a, the high-pressure path 10b for supplying the fuel further pressurized by the high-pressure pump 9 to the right inter-cylinder fuel injection mechanism 41 and the left inter-cylinder fuel injection mechanism 42 of the inter-cylinder fuel injection mechanism 4, a communication path 10*g* that communicates the right inter-cylinder fuel injection mechanism 41 with the left inter-cylinder fuel injection mechanism 42, and the release path 10*c*.

The right inter-intake path fuel injection mechanism 31 and the right inter-cylinder fuel injection mechanism 41 include inter-intake path injectors 31*a* to 31*c* and inter-cylinder injectors 41*a* to 41*c*, respectively, to correspond to three cylinders included in the right bank (not shown in figures). The left inter-intake path fuel injection mechanism 32 and the left inter-cylinder fuel injection mechanism 42 include inter-intake path injectors 32*a* to 32*c* and inter-cylinder injectors 42*a* to 42*c*, respectively, to correspond to three cylinders included in a left bank (not shown in figures). The right inter-intake path fuel injection mechanism 31 and the left inter-intake path fuel injection mechanism 32 include fuel distribution pipes 31*d* and 32*d* that distribute the fuel supplied from the right branch path 8*h* and the left branch path 8*i* to the right inter-intake path injectors 31*a* to 31*c* and to the left inter-intake path injectors 32*a* to 32*c*, respectively. The right inter-cylinder fuel injection mechanism 41 and the left inter-cylinder fuel injection mechanism 42 include fuel distribution pipes 41*d* and 42*d* that distribute the fuel supplied from the high-pressure path 10*b* or the communication path 10*g* of the second fuel supply system 10 to the right inter-cylinder injectors 41*a* to 41*c* and to the left inter-cylinder injectors 42*a* to 42*c*, respectively.

Figure 19A:
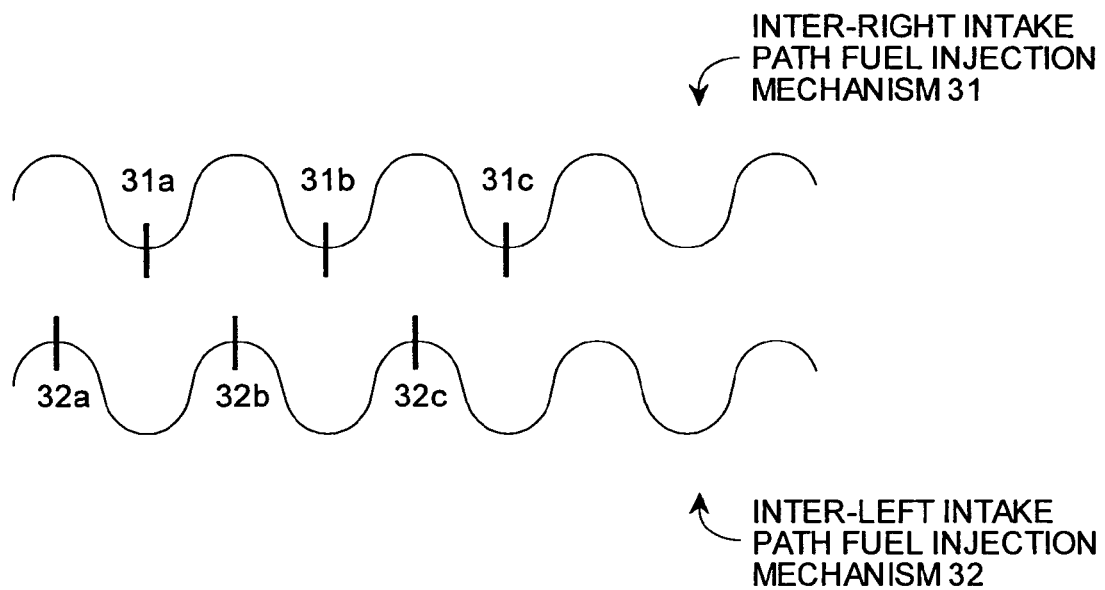
FIG. 19A is a diagram for explaining a width of a fluctuation in the pressure of the fuel when the right and the left branch paths are equal in path length.
Figure 19B:
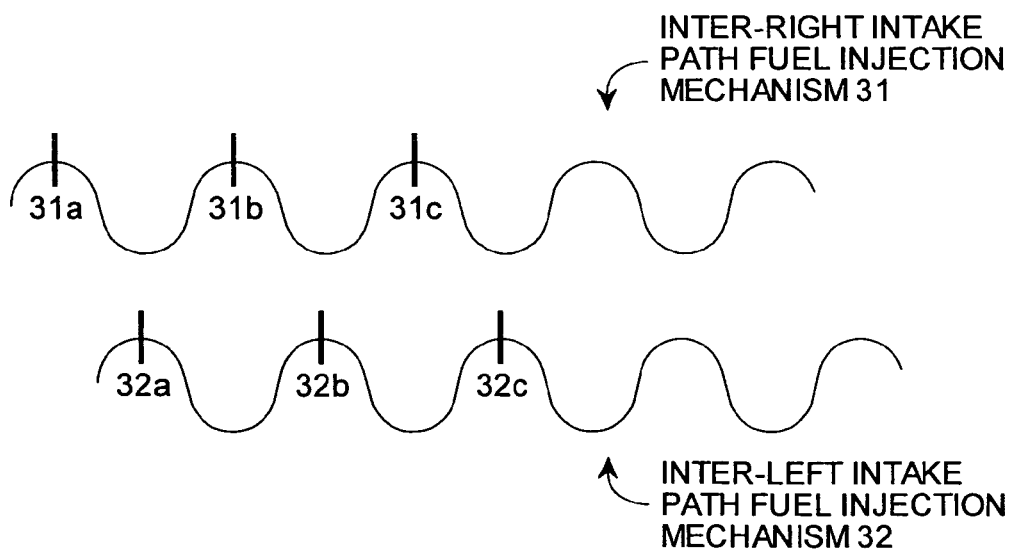
FIG. 19B is a diagram for explaining the width of the fluctuation in the pressure of the fuel when the right and the left branch paths differ in path length.

The problem that occurs when the right branch path 8*h* and the left branch path 8*i* are equal in path length will now be explained. FIG. 19A is a diagram for explaining a width of a fluctuation in the pressure of the fuel when the right and the left branch paths are equal in path length. FIG. 19B is a diagram for explaining the width of the fluctuation in the pressure of the fuel when the right and the left branch paths differ in path length. As shown in FIG. 19A, when the right branch path 8*h* and the left branch path 8*i* are equal in path length, the width of the fluctuation in the pressure of the fuel in the right inter-intake path fuel injection mechanism 31 and that in the left inter-intake path fuel injection mechanism 32 caused by the pulsation propagated from the high-pressure pump 9 to the right inter-intake path fuel injection mechanism 31 and to the left inter-intake path fuel injection mechanism 32 are equal in phase. When the fuel injecting apparatus 1-7 performs inter-cylinder and inter-intake path injection or inter-intake path injection to supply the fuel to the engine, the fuel is injected alternately from the right inter-intake path injectors 31*a* to 31*c* of the right inter-intake path fuel injection mechanism 31 and the left inter-intake path injectors 32*a* to 32*c* of the left inter-intake path fuel injection mechanism 32. Namely, as shown in FIG. 19A, the fuel is injected from the respective injectors in an order of the right inter-intake path injector 31*a*, the left inter-intake path injector 32*a*, the right inter-intake path injector 31*b*, the left inter-intake path injector 32*b*, the right inter-intake path injector 31*c*, the left inter-intake path injector 32*c*. At this time, when an injection timing of each of the injectors 31*a* to 32*c* is half a cycle of the width of the fluctuation in the pressure of the fuel, then the right inter-intake path injectors 31*a* to 31*c* inject the fuel at a time of an upper limit of the width of the fluctuation in the pressure of the fuel in the right inter-intake path fuel injection mechanism 31. In addition, the left inter-intake path injectors 32*a* to 32*c* inject the fuel at a time of a lower limit of the width of the fluctuation in the pressure of the fuel in the left inter-intake path fuel injection mechanism 32. If the injection controller 5 controls the respective injectors 31*a* to 32*c* to be equal in valve opening time, i.e., current-carrying time, an irregularity occurs between the injection amount of the fuel injected from the right inter-intake path fuel injection mechanism 31 and that from the left inter-intake path fuel injection mechanism 32.

Considering the above problem, the fuel injecting apparatus 1-7 including the fuel supplying apparatus 2-7 according to the seventh embodiment is constituted so that the right branch path 8*h* differs in path length from the left branch path 8*i*, and so that the phase of the pulsation propagated from the high-pressure pump 9 to the right inter-intake path fuel injection mechanism 31 is inverted from that of the pulsation propagated from the high-pressure pump 9 to the left inter-intake path fuel injection mechanism 32. By doing so, as shown in FIG. 19B, the phase of the cycle of the width of the fluctuation in the pressure of the fuel in the left inter-intake path fuel injection mechanism 32 is inverted from that of the cycle of the width of the fluctuation in the pressure of the fuel in the right inter-intake path fuel injection mechanism 31. It is, therefore, possible to prevent the irregularity between the injection amount of the fuel injected from the right inter-intake path fuel injection mechanism 31 and that from the left inter-intake path fuel injection mechanism 32. By thus preventing the irregularity of the fuel injection amount between the first fuel injection mechanisms of each cylinder group, the influence of the pulsation generated in the high-pressure pump 9 on the fuel supply amount by which the fuel is supplied to the engine, particularly, the injection amount of the fuel injected from the injectors 31*a* to 32*c* of the right inter-intake path fuel injection mechanism 31 and the left inter-intake path fuel injection mechanism 32 that serve as the first fuel injection mechanisms can be lessened.

In the fuel injecting apparatus 1-7, the injection controller 5 controls the injection of the fuel from the right inter-intake path fuel injection mechanism 31 and the left inter-intake path fuel injection mechanism 32 based on respective predetermined phases of the pulsations propagated from the high-pressure pump 9 to the right inter-intake path fuel injection mechanism 31 and the left inter-intake path fuel injection mechanism 32 that serve as the first fuel injection mechanisms. Namely, the injection controller 5 controls the injection of the fuel from the right inter-intake path fuel injection mechanism 31 and the left inter-intake path fuel injection mechanism 32 so as to inject the fuel from the right inter-intake path fuel injection mechanism 31 and the left inter-intake path fuel injection mechanism 32 at the respective predetermined phases of the pulsations. The predetermined phases of the pulsations are upper limits or lower limits of the pulsation, that is, upper limits or lower limits of the fluctuations in the pressure of the fuel in the right inter-intake path fuel injection mechanism 31 and the left inter-intake path fuel injection mechanism 32 that serve as the first fuel injection mechanisms, respectively. Therefore, when the fuel is injected from the right inter-intake path fuel injection mechanism 31 and the left inter-intake path fuel injection mechanism 32 at the upper limits of the fluctuations in the pressure of the fuel in the right inter-intake path fuel injection mechanism 31 and the left inter-intake path fuel injection mechanism 32, the injected fuel can be transformed to fine particles. Thus, combustion efficiency and an emission of the engine can be thereby enhanced. Further, when the fuel is injected from the right inter-intake path fuel injection mechanism 31 and the left inter-intake path fuel injection mechanism 32 at the lower limits of the fluctuations in the pressure of the fuel in the right inter-intake path fuel injection mechanism 31 and the left inter-intake path fuel injection mechanism 32, the pressure of the fuel in the right inter-intake path fuel injection mechanism 31 and the left inter-intake path fuel injection mechanism 32 is lower than that of the fuel supplied into the right inter-intake path fuel injection mechanism 31 and the left inter-intake path fuel injection mechanism 32 by the low-pressure pump 7. It is thereby possible to improve dynamic ranges of the respective injectors 31a to 31c, that is, inject less fuel from the respective injectors 31a to 31c.

Figure 20:
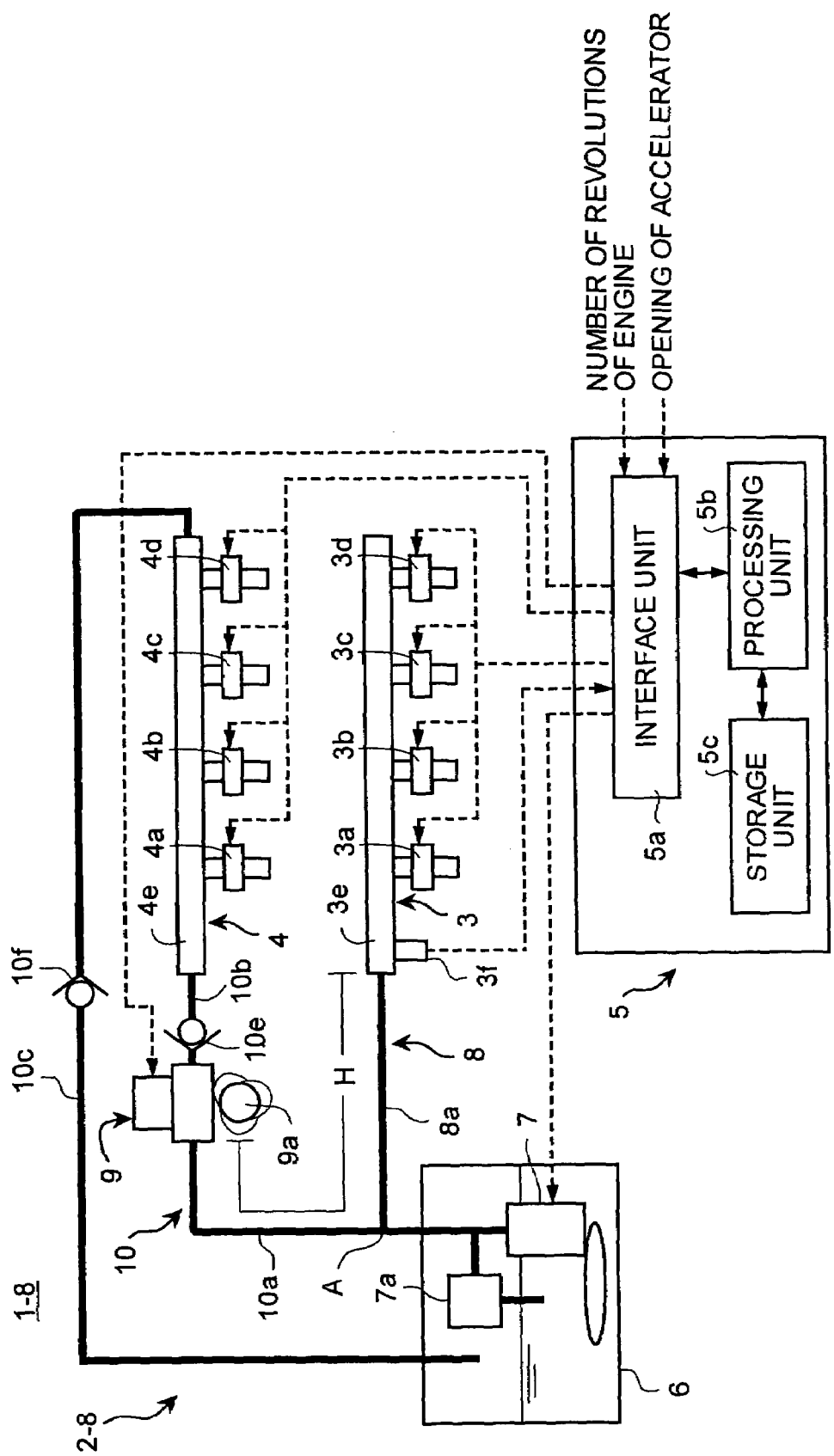
FIG. 20 is a configuration diagram of a fuel injecting apparatus including fuel supplying apparatus according to an eighth embodiment.

FIG. 20 is a configuration diagram of a fuel injecting apparatus including a fuel supplying apparatus according to an eighth embodiment. A fuel injecting apparatus 1-8 shown in FIG. 20 differs from the fuel injecting apparatus 1-5 shown in FIG. 14 in that a fuel pressure sensor 3f is provided in the fuel injecting apparatus 1-8. Since the basic configuration of the fuel injecting apparatus 1-8 shown in FIG. 20 is the same as that of the fuel injecting apparatus 1-5 shown in FIG. 14, the explanation therefor will be omitted.

Figure 21:
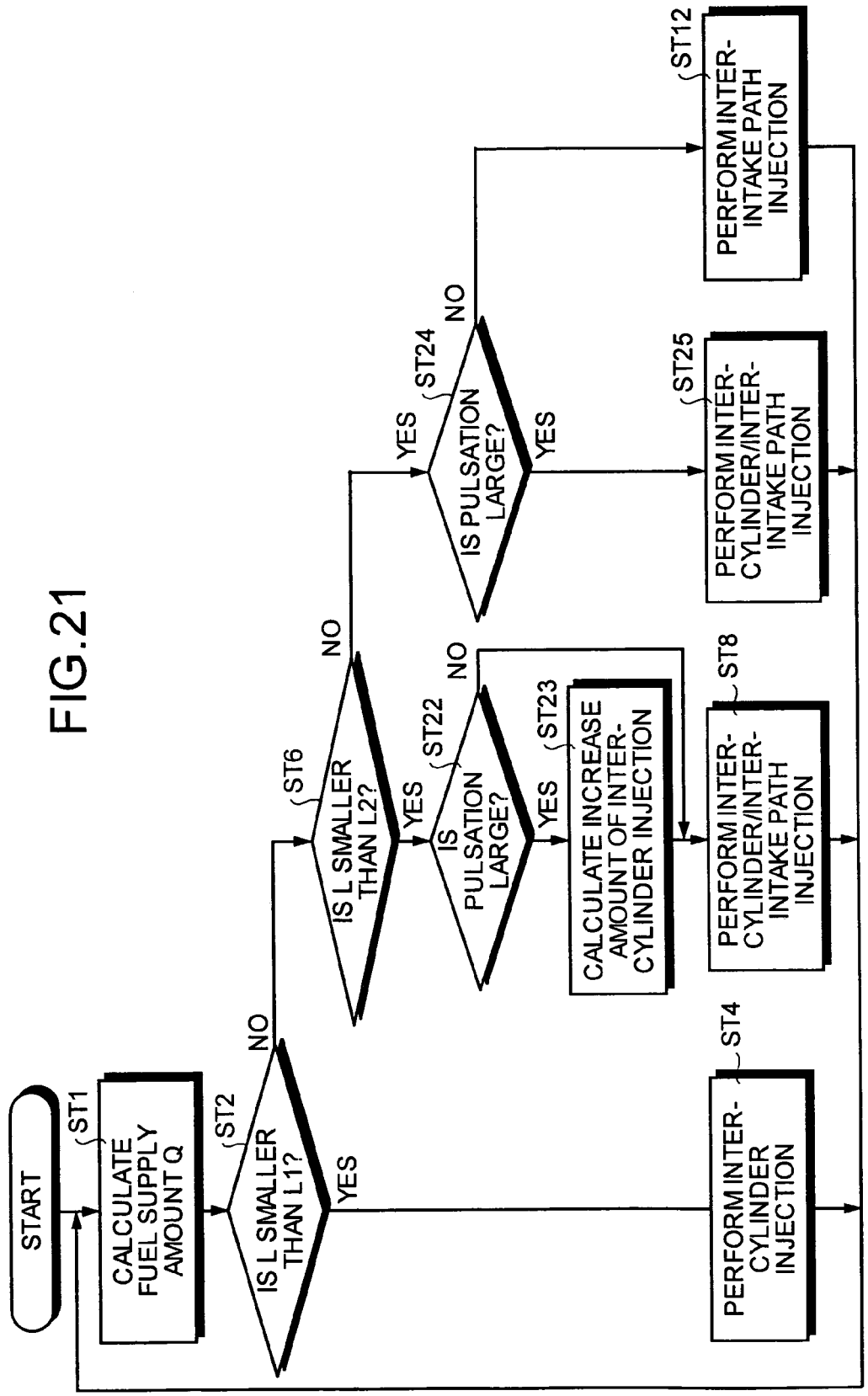
FIG. 21 is a flow chart of injection control of the fuel injecting apparatus according to the eighth embodiment.

The fuel pressure sensor 3f is provided in the inter-intake path fuel injection mechanism 3 that serves as the first fuel injection mechanism. This fuel pressure sensor 3f detects the pressure of the fuel in the inter-intake path fuel injection mechanism 3, that is, in the fuel distribution pipe 3e. An output signal corresponding to the pressure of the fuel in the fuel distribution pipe 3e and detected by the fuel pressure sensor 3f is input to the injection controller 5. A fuel injecting method performed by the fuel injecting apparatus according to the eighth embodiment will next be explained. FIG. 21 is a flow chart of injection control of the fuel injecting apparatus according to the eighth embodiment. The flow of the fuel injecting method performed by the fuel injecting apparatus shown in FIG. 21 is basically the same as that of the fuel injecting method performed by the fuel injecting apparatus 1-2 shown in FIG. 6. Therefore, the flow will be explained simply. As shown in FIG. 21, the processing unit 5b of the fuel controller 5 calculates the fuel supply amount Q to be supplied to the engine (at a step ST1).

The processing unit 5b determines whether the accelerator opening L is smaller than the predetermined value L1 (at a step ST2). When the accelerator opening L is smaller than the predetermined value L1, the injection controller 5 that serves as the control unit determines that the injection range is the inter-cylinder injection range, based on the operating state of the engine that serves as the internal combustion engine, as shown in FIG. 4. The processing unit 5b outputs output signals for the injection timings and the injection amounts to the inter-cylinder injectors 4a to 4d of the inter-cylinder fuel injection mechanism 4 in order to supply the fuel that satisfies the fuel supply amount Q to the engine, and the fuel injecting apparatus 1-8 performs inter-cylinder injection (at a step ST4).

When the acceleration opening L is equal to or larger than the predetermined value L1 at the step ST2, The processing unit 5b determines whether the accelerator opening L is smaller than the predetermined value L2 (at a step ST6). When the accelerator opening L is equal to or smaller than the predetermined value L2, the injection controller 5 that serves as the control unit determines that the injection range is the inter-cylinder and inter-intake path injection range as shown in FIG. 4. The control unit 5b then determines whether the pulsation propagated from the high-pressure pump 9 to the inter-intake path fuel injection mechanism 3 that serves as the first fuel injection mechanism is large (at a step ST22). When the pulsation propagated from the high-pressure pump 9 to the inter-intake path fuel injection mechanism 3 is large, the width of the fluctuation in the pressure of the fuel in the inter-intake path injection mechanism 3 is large. Accordingly, the injection controller 5 can determines whether the pulsation propagated from the high-pressure pump 9 to the inter-intake path fuel injection mechanism 3 is large based on the output signal that is corresponding to the pressure in the inter-intake path fuel injection mechanism 3 and that output from the fuel pressure sensor 3f.

If determining that the pulsation is large, the processing unit 5b calculates an increase amount of the inter-cylinder injection in proportion to the magnitude of this pulsation (at a step ST23). For inter-cylinder and inter-intake path fuel injection, an injection amount of the fuel injected from the inter-intake path injectors 3a to 3d of the inter-intake path fuel injection mechanism 3 and that of the fuel injected from the inter-cylinder injectors 4a to 4d of the inter-cylinder fuel injection mechanism 4 are determined by the map as shown in FIG. 4. In this embodiment, the injection amount of the fuel injected from the inter-intake path injectors 3a to 3d is reduced, and the injection amount of the fuel injected from the inter-cylinder injectors 4a to 4d is increased without changing the fuel supply amount Q of the fuel to be supplied to the engine. In other words, a ratio of the fuel supply amount by which the fuel is supplied to the engine by inter-intake path injection to the fuel supply amount by which the fuel is supplied to the engine by inter-cylinder injection is changed. The processing unit 5b then outputs output signals for the injection timings and the injection amounts to the inter-intake path injectors 3a to 3d of the inter-intake path fuel injection mechanism 3 and the inter-cylinder injectors 4a to 4d of the inter-cylinder fuel injection mechanism 4 based on the inter-cylinder injection increase amount calculated at the step ST23 in order to supply the fuel that satisfies the fuel supply amount Q to the engine, and the fuel injecting apparatus 1-8 performs inter-cylinder and inter-intake path injection (at a step ST8). Accordingly, in the inter-cylinder and inter-intake path injection range for supplying the fuel to the engine both by the first fuel injection mechanism and the second fuel injection mechanism, the injection amount of the fuel from the inter-intake path injectors 3a to 3d is reduced. Therefore, even if the pulsation generated in the high-pressure pump 9 is propagated to the inter-intake path fuel injection mechanism 3, the influence of the pulsation generated in the high-pressure pump 9 on the fuel supply amount by which the fuel is supplied into the engine, particularly, the fuel injection amount by which the fuel is injected from the inter-intake path injectors 3a to 3d of the inter-intake path fuel injection mechanism 3 that serves as that first fuel injection mechanism can be lessened.

If determining that the pulsation is not large at the step ST22, the processing unit 5b outputs output signals for the injection timings and the injection amounts to the inter-intake path injectors 3a to 3d of the inter-intake path fuel injection mechanism 3 and the inter-cylinder injectors 4a to 4d of the inter-cylinder fuel injection mechanism 4 based on the map shown in FIG. 4, and the fuel injecting apparatus 1-8 perform inter-cylinder and inter-intake path injection (at a step ST8).

When the accelerator opening L is equal to or larger than the predetermined value L2 at the step ST6, the injection controller 5 that serves as the control unit determines that the injection range is the inter-intake path injection range as shown in FIG. 4. The processing unit 5b then determines whether the pulsation propagated from the high-pressure pump 9 to the inter-intake path fuel injection mechanism 3 that serves as the first fuel injection mechanism is large (at a step ST24). If determining that the pulsation is large, the processing unit 5b outputs output signals for the injection timings and the injection amounts to the inter-intake path injectors 3a to 3d of the inter-intake path fuel injection mechanism 3 and the inter-cylinder injectors 4a to 4d of the inter-cylinder fuel injection mechanism 4 in order to supply the fuel that satisfies the fuel supply amount Q to the engine, and the fuel injecting apparatus 1-8 performs inter-cylinder and inter-intake path injection (at a step ST25). For inter-intake path injection, the injection amount of the inter-intake path injectors 3a to 3d of the inter-intake path fuel injection mechanism 3 is determined by the map as shown in 4. In this embodiment, the fuel is injected from the inter-cylinder injectors 4a to 4d without changing the fuel supply amount Q of the fuel to be supplied to the engine, thereby reducing the injection amount of the fuel injected from the inter-intake path injectors 3a to 3d. Accordingly, in the inter-intake path injection range for supplying the fuel to the engine only by the first fuel injection mechanism, the injection amount of the fuel from the inter-intake path injectors 3a to 3d is reduced. Therefore, even if the pulsation generated in the high-pressure pump 9 is propagated to the inter-intake path fuel injection mechanism 3, the influence of the pulsation generated in the high-pressure pump 9 on the fuel supply amount by which the fuel is supplied into the engine, particularly, the fuel injection amount by which the fuel is injected from the inter-intake path injectors 3a to 3d of the inter-intake path fuel injection mechanism 3 that serves as that first fuel injection mechanism can be lessened.

If determining that the pulsation is not large at the step ST24, the processing unit 5b outputs output signals for the injection timings and the injection amounts to the inter-intake path injectors 3a to 3d of the inter-intake path fuel injection mechanism 3 based on the map shown in FIG. 4, and the fuel injecting apparatus 1-8 performs inter-intake path injection (at a step ST12).

According to the eighth embodiment, the fuel controller 5 determines whether the pulsation propagated from the high-pressure pump 9 to the inter-intake path fuel injection mechanism 3 that serves as the first fuel injection mechanism is large, based on the pressure of the fuel in the inter-intake path fuel injection mechanism 3 output from the fuel pressure sensor 3f. However, the present invention is not limited to this instance. For example, the map that represents the relationship between the number of revolutions Ne of the engine and the magnitude of the pulsation may be stored in the storage unit 5c of the injection controller 5 based on the number of revolutions Ne of the engine and the fuel supply amount Q by which the fuel is supplied to the engine, and the magnitude of the pulsation may be determined from the number of revolutions Ne of the engine.

Further, when the processing unit 5b determines that the fuel injection range is the inter-cylinder and inter-intake path injection range or the inter-intake path injection range, and determines whether the pulsation propagated from the high-pressure pump 9 to the inter-intake path fuel injection mechanism 3 that serves as the first fuel injection mechanism is large, the processing unit 5 may output the output signals for the injection timings and the injection amounts to the inter-cylinder injectors 4a to 4d, and the fuel injecting apparatus 1-8 may perform only inter-intake path injection.

The internal combustion engine fuel supplying apparatus and the internal combustion engine fuel injecting apparatus according to the above embodiments exhibit the following effects. The propagation of the pulsation generated in the high-pressure pump to the first fuel injection mechanism is suppressed. The irregularity in the injection amount of the fuel among the first fuel injection mechanism for each cylinder group is suppressed. An injection amount of the fuel injected from the first fuel injection mechanism is reduced. The influence of the pulsation generated from the high-pressure pump on a fuel supply amount, by which the fuel is supplied to the internal combustion engine can be thereby lessened.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel supplying apparatus of an internal combustion engine, comprising:
   a first fuel supply system that pressurizes a fuel by a low-pressure pump, and that supplies the fuel pressurized by the low-pressure pump to a first fuel injection mechanism;
   a second fuel supply system that is branched from the first fuel supply system, that further pressurizes the fuel, pressurized by the low-pressure pump, by a high-pressure pump that is driven according to an operating state of the internal combustion engine, and that supplies the fuel pressurized by the high-pressure pump to a second fuel injection mechanism; and
   a pulsation generating number-of-revolutions change unit that changes the number of revolutions of the internal engine at which a pulsation propagated from the high-pressure pump to the first fuel injection mechanism is increased.

2. The fuel supplying apparatus according to claim 1, wherein
   the pulsation generating number-of-revolutions change unit changes a path length from the high-pressure pump to the first fuel injection mechanism.

3. The fuel supplying apparatus according to claim 2, wherein
   the pulsation generating number-of-revolutions change unit changes the path length from the high-pressure pump to the first fuel injection mechanism so that the number of revolutions of the internal combustion engine, at which the pulsation propagated from the high-pressure pump to the first fuel injection mechanism is increased, is deviated from a present number of revolutions of the internal combustion engine.

4. A fuel supplying apparatus of an internal combustion engine, comprising:
   a first fuel supply system that pressurizes a fuel by a low-pressure pump, and that supplies the fuel pressurized by the low-pressure pump to a first fuel injection mechanism; and
   a second fuel supply system that is branched from the first fuel supply system, that further pressurizes the fuel, pressurized by the low-pressure pump, by a high-pressure pump that is driven according to an operating state of the internal combustion engine, and that supplies the fuel further pressurized by the high-pressure pump to a second fuel injection mechanism, wherein
   the first fuel injection mechanism is provided for each of cylinder groups of the internal combustion engine, and
   the first fuel supply system inverts a phase of a pulsation propagated from the high-pressure pump to the first fuel injection mechanism of the one of the cylinder groups, from a phase of the pulsation propagated from the high-pressure pump to the first fuel injection mechanism of the other cylinder group.

5. A fuel injecting apparatus of an internal combustion engine, comprising:
a fuel supplying apparatus including a first fuel supply system that pressurizes a fuel by a low-pressure pump and that supplies the fuel pressurized by the low-pressure pump to a first fuel injection mechanism, and a second fuel supply system that is branched from the first fuel supply system, that further pressurizes the fuel, pressurized by the low-pressure pump, by a high-pressure pump that is driven according to an operating state of the internal combustion engine, and that supplies the fuel pressurized by the high-pressure pump to a second fuel injection mechanism;
a first fuel injection mechanism that injects the fuel pressurized by the low-pressure pump;
a second fuel injection mechanism that injects the fuel pressurized by the high-pressure pump; and
a control unit that controls injection of the first fuel injection mechanism and injection of the second fuel injection mechanism according to the operating state of the internal combustion engine, wherein
the first fuel injection mechanism is provided for each of cylinder groups of the internal combustion engine,
the first fuel supply system inverts a phase of a pulsation propagated from the high-pressure pump to the first fuel injection mechanism of the one of the cylinder groups, from a phase of the pulsation propagated from the high-pressure pump to the first fuel injection mechanism of the other cylinder group, and
the control unit controls the injection of the fuel from the first fuel injection mechanism based on a predetermined phase of the pulsation propagated from the high-pressure pump to the first fuel injection mechanism.

6. A fuel injecting apparatus of an internal combustion engine, comprising:
a low-pressure pump that pressurizes a fuel;
a first fuel injection mechanism that injects the fuel pressurized by the low-pressure pump;
a first fuel supply system that supplies the fuel from the low-pressure pump to the first fuel injection mechanism;
a high-pressure pump that further pressurizes the fuel pressurized by the low-pressure pump;
a second fuel injection mechanism that injects the fuel pressurized by the high-pressure pump;
a second fuel supply system that is branched from the first fuel supply system, and that supplies the fuel to the second fuel injection mechanism; and
a control unit that controls injection of the first fuel injection mechanism and injection of the second fuel injection mechanism according to an operating state of the internal combustion engine, wherein
when the control unit determines that an injection range of the fuel is an injection range only by the first fuel injection mechanism based on the operating state of the internal combustion engine, and determines that a pulsation propagated from the high-pressure pump to the first fuel injection mechanism is large, the control unit exercises a control so as to inject the fuel at least from the second fuel injection mechanism.

7. A fuel injecting apparatus of an internal combustion engine, comprising:
a low-pressure pump that pressurizes a fuel;
a first fuel injection mechanism that injects the fuel pressurized by the low-pressure pump;
a first fuel supply system that supplies the fuel from the low-pressure pump to the first fuel injection mechanism;
a high-pressure pump that further pressurizes the fuel pressurized by the low-pressure pump;
a second fuel injection mechanism that injects the fuel pressurized by the high-pressure pump;
a second fuel supply system that is branched from the first fuel supply system, and that supplies the fuel to the second fuel injection mechanism; and
a control unit that controls injection of the first fuel injection mechanism and injection of the second fuel injection mechanism according to an operating state of the internal combustion engine, wherein
when the control unit determines that an injection range of the fuel is an injection range both by the first fuel injection mechanism and the second fuel injection mechanism based on the operating state of the internal combustion engine, and determines that a pulsation propagated from the high-pressure pump to the first fuel injection mechanism is large, the control unit exercises a control so as to increase the fuel injected from the second fuel injection mechanism.

* * * * *